(12) United States Patent
Kim et al.

(10) Patent No.: US 10,891,112 B2
(45) Date of Patent: Jan. 12, 2021

(54) SYSTEMS AND METHODS FOR DISCOVERING AUTOMATABLE TASKS

(71) Applicant: Soroco Private Limited, London (GB)

(72) Inventors: Yoongu Kim, Cambridge, MA (US); Abdul Qadir, Bangalore (IN); Arjun Narayanaswamy, Bangalore (IN); Rohan Narayan Murty, Bangalore (IN); Shane Barratt, Portola Valley, CA (US); George Peter Nychis, Somerville, MA (US)

(73) Assignee: Soroco Private Limited, London (GB)

( * ) Notice: Subject to any disclaimer, the term of this patent is extended or adjusted under 35 U.S.C. 154(b) by 0 days.

(21) Appl. No.: 16/788,726

(22) Filed: Feb. 12, 2020

(65) Prior Publication Data
US 2020/0183656 A1     Jun. 11, 2020

Related U.S. Application Data

(63) Continuation of application No. 15/794,934, filed on Oct. 26, 2017, now Pat. No. 10,613,838.
(Continued)

(51) Int. Cl.
*G06F 8/30*     (2018.01)
*G06F 11/34*     (2006.01)
(Continued)

(52) U.S. Cl.
CPC ............ *G06F 8/30* (2013.01); *G06F 9/3857* (2013.01); *G06F 9/451* (2018.02); *G06F 9/542* (2013.01);
(Continued)

(58) Field of Classification Search
CPC .................................................. G06F 11/3438
See application file for complete search history.

(56) References Cited

U.S. PATENT DOCUMENTS 7,234,126 B2   6/2007   Catthoor et al.
7,421,654 B2   9/2008   Wugoski
(Continued)

OTHER PUBLICATIONS

International Search Report and Written Opinion for International Application No. PCT/US2017/58603 dated Jan. 5, 2018.
(Continued)

*Primary Examiner* — Esther B. Henderson
(74) *Attorney, Agent, or Firm* — Wolf, Greenfield & Sacks, P.C.

(57) ABSTRACT

According to at least one aspect, a system for analyzing computer usage data of a user to identify an underlying task being performed by the user is provided. The system includes a hardware processor and a non-transitory computer-readable storage medium storing processor-executable instructions that, when executed by the hardware processor, cause the hardware processor to perform: receiving a plurality of events each indicative of an action performed by a user and contextual information associated with the action performed by the user, clustering the plurality of events to generate a plurality of clustered events, identifying a plurality of sub-tasks in the plurality of clustered events that each comprise a sequence of clustered events, identifying a task in the plurality of clustered events being performed by the user that comprises at least one sub-task, and generating a score for the task indicative of a difficulty of automating the task.

20 Claims, 7 Drawing Sheets

Related U.S. Application Data

(60) Provisional application No. 62/413,277, filed on Oct. 26, 2016.

(51) Int. Cl.
   *G06F 9/38*      (2018.01)
   *H04L 29/08*     (2006.01)
   *G06F 9/54*      (2006.01)
   *G06F 9/451*     (2018.01)
   *G06F 11/30*     (2006.01)
   *G06N 3/02*      (2006.01)

(52) U.S. Cl.
   CPC ...... *G06F 11/3051* (2013.01); *G06F 11/3414* (2013.01); *G06F 11/3423* (2013.01); *G06F 11/3438* (2013.01); *G06F 11/3447* (2013.01); *G06F 11/3476* (2013.01); *G06N 3/02* (2013.01); *H04L 67/22* (2013.01); *H04L 67/36* (2013.01); *G06F 2201/81* (2013.01)

(56) References Cited

U.S. PATENT DOCUMENTS

| | | |
|---|---|---|
| 7,756,272 B2 | 7/2010 | Kocher et al. |
| 7,996,913 B2 | 8/2011 | Kocher et al. |
| 8,209,702 B1 | 6/2012 | Roytman et al. |
| 8,433,733 B2 | 4/2013 | Sayed et al. |
| 9,047,147 B2 | 6/2015 | Francis |
| 9,053,299 B2 | 6/2015 | Wieder |
| 9,384,121 B2 | 7/2016 | Jackson et al. |
| 9,465,679 B2 | 10/2016 | Stanley-Marbell et al. |
| 9,465,806 B2 | 10/2016 | Baker et al. |
| 9,477,333 B2 | 10/2016 | Townsend et al. |
| 9,542,004 B1 | 1/2017 | Hu |
| 9,602,495 B2 | 3/2017 | Wyn-Harris |
| 10,120,653 B2 | 11/2018 | Kim et al. |
| 10,195,531 B2 | 2/2019 | Osman et al. |
| 2007/0299631 A1 | 12/2007 | Macbeth et al. |
| 2009/0106262 A1 | 4/2009 | Fallen et al. |
| 2013/0055268 A1 | 2/2013 | Amershi et al. |
| 2013/0304906 A1 | 11/2013 | Yavilevich et al. |
| 2014/0129961 A1 | 5/2014 | Zubarev et al. |
| 2014/0132571 A1 | 5/2014 | Zeng et al. |
| 2014/0157288 A1 | 6/2014 | Wong |
| 2014/0215495 A1 | 7/2014 | Enrich et al. |
| 2014/0237033 A1 | 8/2014 | Shang |
| 2015/0135198 A1 | 5/2015 | Pack, III et al. |
| 2015/0339033 A1 | 11/2015 | Arnold et al. |
| 2016/0034274 A1 | 2/2016 | Diao et al. |
| 2016/0055040 A1 | 2/2016 | Treat et al. |
| 2016/0313939 A1 | 10/2016 | Andrews et al. |
| 2016/0378291 A1 | 12/2016 | Pokrzywka |
| 2017/0124531 A1 | 5/2017 | McCormack |
| 2017/0277396 A1 | 9/2017 | Chung et al. |
| 2018/0113780 A1 | 4/2018 | Kim et al. |
| 2018/0113781 A1 | 4/2018 | Kim et al. |
| 2018/0181377 A1 | 6/2018 | Kim et al. |
| 2019/0034173 A1 | 1/2019 | Kim et al. |

OTHER PUBLICATIONS

Clapp et al., Minimizing GUI Event Traces. Stanford Univeristy. FSE' 2016:422-34.

Lü et al., Gesture studio: authoring multi-touch interactions through demonstration and declaration. Proceedings of the SIGCHI Conference on Human Factors in Computing Systems, ACM. Apr. 27, 2013:257-266.

Oh et al., Audio-based feedback techniques for teaching touch-screen gestures. ACM Transactions on Accessible Computing (TACCESS). Nov. 14, 2015;7(3):29 pages.

Zhang et al., Panappticon: Event-based Tracing to Measure Mobile Application and Platform Performance. IEEE. 2013:10 pages.

Extended European Search Report for European Application No. 17864947.1 dated Jun. 2, 2020.

U.S. Appl. No. 15/794,912, filed Oct. 26, 2017, Kim et al.
U.S. Appl. No. 15/794,934, filed Oct. 26, 2017, Kim et al.
U.S. Appl. No. 15/904,138, filed Feb. 23, 2018, Kim et al.
U.S. Appl. No. 16/153,003, filed Oct. 5, 2018, Kim et al.

SYSTEMS AND METHODS FOR DISCOVERING AUTOMATABLE TASKS

CROSS-REFERENCE TO RELATED APPLICATIONS

This Application is a Continuation of and claims priority under 35 U.S.C. § 120 to U.S. application Ser. No. 15/794,934, filed Oct. 26, 2017, entitled "SYSTEMS AND METHODS FOR DISCOVERING AUTOMATABLE TASKS", which claims the benefit under 35 U.S.C. § 119(e) of U.S. Provisional Application Ser. No. 62/413,277, filed Oct. 26, 2016, entitled "SYSTEMS AND METHODS FOR DISCOVERING AUTOMATABLE TASKS", each of which is herein incorporated by reference in its entirety.

BACKGROUND

Employees at many companies spend much of their time working on computers. An employer may monitor an employee's computer activity by installing a monitoring application program on the employee's work computer to monitor the employee's actions. For example, an employer may install a keystroke logger application on the employee's work computer. The keystroke logger application may be used to capture the employee's keystrokes and store the captured keystrokes in a text file for subsequent analysis. Other applications for monitoring computer activity may periodically pose questions to the employee regarding their current activity. For example, the application may ask the employee "what are you doing?" and subsequently ask "are you still doing this?"

SUMMARY

According to at least one aspect, a system for collecting computer usage information is provided. The system includes at least one hardware processor, a display coupled to the at least one hardware processor and configured to display a user interface, and at least one non-transitory computer-readable storage medium storing processor-executable instructions that, when executed by the at least one hardware processor, cause the at least one hardware processor to perform various functions. For example, the instructions may cause the at least one hardware processor to receive an indication of an action being performed by a user on the system, cause the system to wait before updating the user interface in response to the action performed by the user, gather contextual information associated with the action while the system is waiting to process the action performed by the user to update the user interface, cause the system to update the user interface in response to the action performed by the user after gathering the contextual information, and store information indicative of the action and the contextual information.

In some embodiments, the action includes at least one of a keystroke and a screen click.

In some embodiments, the contextual information includes information regarding a state of the user interface. In some embodiments, the information regarding the state of the user interface includes at least one of: an indication of an active application, a title in a title bar of the active application, a value in at least one field of the active application, a size of a window of the active application, and a location of the window of the active application.

In some embodiments, the system further comprises a random access memory (RAM) and wherein storing the information includes storing the information indicative of the action and the contextual information in the RAM as an event. In some embodiments, the system further comprises a non-transitory computer readable medium and the processor-executable instructions further cause the at least one hardware processor to write one or more events stored in the RAM to an event log in the non-transitory computer readable medium. In some embodiments, the processor-executable instructions further cause the at least one hardware processor to determine whether at least one event stored in the RAM includes personal information of the user. In some embodiments, the personal information of the user includes information indicative of at least one of: a bank account of the user, a personal email account of the user, and a social media account of the user. In some embodiments, the system further comprises a non-transitory computer readable medium and the processor-executable instructions further cause the at least one hardware processor to write the at least one event stored in the RAM to an event log in the non-transitory computer readable medium responsive to a determination that the at least one event does not include personal information of the user. In some embodiments, the processor-executable instructions further cause the at least one hardware processor to transmit the event log to an external system.

According to at least one aspect, a system for identifying automatable tasks is provided. The system includes at least one hardware processor, a communication interface coupled to the at least one hardware processor and configured to communicate with at least one computing device, and at least one non-transitory computer-readable storage medium storing processor-executable instructions that, when executed by the at least one hardware processor, cause the at least one hardware processor to perform various functions. For example, the instructions may cause the at least one hardware processor to receive, via the communication interface, a plurality of events from the at least one computing device, each of the plurality of events including information indicative of an action performed by a user on the respective computing device and contextual information associated with the action performed by the user, identify at least one sequence of events in the plurality of events that is at least partially repeated in the plurality of events and associated with a task being performed by the user, and generate a metric associated with the task indicative of a difficulty of automating the task.

In some embodiments, the at least one sequence of events includes: a first event including a first action in a first application installed on the respective computing device; and a second event including a second action in a second application installed on the respective computing device. In some embodiments, identifying the at least one sequence of events comprises identifying a first sub-task performed by the user in the first application and a second sub-task performed by the user in the second application.

In some embodiments, the first metric includes at least one of: an estimated cost of developing a software robot to automate the task, an estimated amount of developer hours to create the software robot to automate the task, a number of applications that are employed to perform the task, a number of keystrokes performed in the task, and a ratio between keystrokes and screen clicks performed in the task.

In some embodiments, the processor-executable instructions further cause the at least one hardware processor to generate a second metric associated with the task indicative of a cost savings of automating the task. In some embodiments, generating the second metric includes identifying a length of time that the task is performed by the user and a monetary value of time of the user. In some embodiments, the system further comprises displaying information indicative of the task and at least one of the first and second metrics associated with the task.

In some embodiments, the processor-executable instructions further cause the at least one hardware processor to filter the plurality of events to remove at least one event that is not associated with the task performed by the user. In some embodiments, filtering the plurality of events includes removing events from the plurality of events that are not proceeded by another event within a predetermined period of time. In some embodiments, filtering the plurality of events includes removing events from the plurality of events that are not preceded by another event within a predetermined period of time.

According to at least one aspect, a system is provided to collect computer usage data and identify tasks being performed based on the computer usage data is provided. The system includes a first computing device including at least one hardware processor, a display coupled to the at least one hardware processor and configured to display a user interface, and at least one non-transitory computer-readable storage medium storing processor-executable instructions that, when executed by the at least one hardware processor, cause the at least one hardware processor to perform various functions. For example, the instructions may cause the at least one hardware processor to receive an indication of an action being performed by a user on the first computing device, cause the first computing device to wait before updating the user interface responsive to the action performed by the user, gather contextual information associated with the action while the first computing device is waiting to update the user interface responsive to the action performed by the user, cause the first computing device to update the user interface responsive to the action performed by the user after gathering the contextual information, and transmit information indicative of the action and the contextual information as an event in an event log including a plurality of events. The system may further include a second computing device in communication with the first computing device. The second computing device may include at least one hardware processor and at least one non-transitory computer-readable storage medium storing processor-executable instructions that, when executed by the at least one hardware processor, cause the at least one hardware processor to perform various functions. For example, the instructions may cause the at least one hardware processor to receive the event log including the plurality of events from the first computing device and identify at least one sequence of events in the plurality of events that is at least partially repeated in the plurality of events and associated with a task being performed by the user.

According to at least one aspect, a method for tracking tasks performed by a user of a computing device is provided. The method includes receiving an indication of an action being performed by the user on the computing device, causing the computing device to wait before updating a user interface of the computing device responsive to the action performed by the user, gathering contextual information associated with the action while the computing device is waiting to update the user interface responsive to the action performed by the user, causing the computing device to update the user interface responsive to the action performed by the user, and storing information indicative of the action and the contextual information.

According to at least one aspect, a method for discovering automatable tasks is provided. The method includes receiving a plurality of events from another computing device, each of the plurality of events including information indicative of an action performed by a user on the other computing device and contextual information associated with the action performed by the user, identifying at least one sequence of events in the plurality of events that is at least partially repeated in the plurality of events and associated with a task being performed by the user, and generating a metric associated with the task indicative of a difficulty of automating the task.

According to at least one aspect, a system is provided. The system comprises at least one hardware processor; a display coupled to the at least one hardware processor and configured to display a user interface; and at least one non-transitory computer-readable storage medium storing processor-executable instructions that, when executed by the at least one hardware processor, cause the at least one hardware processor to perform: receiving an indication of an action being performed by a user on the system; causing the system to wait before updating the user interface in response to the action performed by the user; gathering contextual information associated with the action while the system is waiting to process the action performed by the user to update the user interface; causing the system to update the user interface in response to the action performed by the user after gathering the contextual information; and storing information indicative of the action and the contextual information.

In some embodiments, the action includes at least one of a keystroke and a click.

In some embodiments, gathering the contextual information includes gathering information regarding a state of the user interface when the user performed the action. In some embodiments, gathering the information regarding the state of the user interface includes gathering information selected from the group consisting of: a name of an active application, a title in a title bar of the active application, a value in at least one field of the active application, a size of a window of the active application, and a location of the window of the active application within the user interface.

In some embodiments, the system further comprises a volatile memory and storing the information includes storing the information indicative of the action and the contextual information in the volatile memory as an event. In some embodiments, the system further comprises a non-volatile memory and the processor-executable instructions further cause the at least one hardware processor to perform: writing one or more events stored in the volatile memory to an event log in the non-volatile memory. In some embodiments, the processor-executable instructions further cause the at least one hardware processor to perform: transmitting the event log to an external system. In some embodiments, the processor-executable instructions further cause the at least one hardware processor to perform: determining whether at least one event stored in the volatile memory includes personal information of the user. In some embodiments, the personal information of the user includes information indicative of at least one member selected from the group consisting of: a bank account of the user, a personal email account of the user, and a social media account of the user. In some embodiments, the system further comprises a non-volatile memory and the processor-executable instructions further cause the at least one hardware processor to perform: writing the at least one event stored in the volatile memory to an event log in the non-volatile memory responsive to a determination that the at least one event does not include personal information of the user.

In some embodiments, storing the information includes storing the information indicative of the action and the contextual information as an event in a plurality of events and the processor-executable instructions further cause the at least one hardware processor to perform: clustering the plurality of events to generate a plurality of clustered events; identifying a plurality of sub-tasks in the plurality of clustered events, each of the plurality of sub-tasks comprising a sequence of one or more clustered events at least partially repeated in the plurality of clustered events; identifying a task in the plurality of clustered events being performed by the user that comprises at least one sub-task of the plurality of sub-tasks; and generating a score for the task indicative of a difficulty of automating the task. In some embodiments, the processor-executable instructions further cause the at least one hardware processor to perform: determining whether the score exceeds a threshold; generating a first computer program that is configured to perform the task responsive to the score exceeding the threshold; and executing the first computer program configured to perform the task responsive to generating the first computer program. In some embodiments, the first computer program is configured to perform the task at least in part by controlling one or more other computer programs. In some embodiments, the first computer program is configured to control the one or more other computer programs through at least one graphical user interface (GUI) of the one or more other computer programs. In some embodiments, the task comprises a first sub-task and a second sub-task of the plurality of sub-tasks and wherein the first computer program is configured to control a second computer program to perform the first sub-task and control a third computer program to perform the second sub-task.

According to at least one aspect, a method, performed by a computing device, for tracking tasks performed by a user of the computing device is provided. The method comprises: receiving an indication of an action being performed by the user on the computing device; causing the computing device to wait before updating a user interface of the computing device responsive to the action performed by the user; gathering contextual information associated with the action while the computing device is waiting to update the user interface responsive to the action performed by the user; causing the computing device to update the user interface responsive to the action performed by the user; and storing information indicative of the action and the contextual information.

In some embodiments, storing the information includes storing the information indicative of the action and the contextual information in a volatile memory of the computing device as an event. In some embodiments, the method further comprises determining whether at least one event stored in the volatile memory includes personal information of the user. In some embodiments, determining whether the at least one event stored in the volatile memory includes personal information of the user includes determining whether the at least one event stored in the volatile memory comprises information indicative of at least one member selected from the group consisting of: a bank account of the user, a personal email account of the user, and a social media account of the user. In some embodiments, the method further comprises writing the at least one event stored in the volatile memory to an event log in a non-volatile memory of the computing device responsive to a determination that the at least one event does not include personal information of the user. In some embodiments, the method further comprises transmitting the event log to an external system.

In some embodiments, storing the information includes storing the information indicative of the action and the contextual information as an event in a plurality of events and wherein the method further comprises: clustering the plurality of events to generate a plurality of clustered events; identifying a plurality of sub-tasks in the plurality of clustered events, each of the plurality of sub-tasks comprising a sequence of one or more clustered events at least partially repeated in the plurality of clustered events; identifying a task in the plurality of clustered events being performed by the user that comprises at least one sub-task of the plurality of sub-tasks; and generating a score for the task indicative of a difficulty of automating the task. In some embodiments, the method further comprises determining whether the score exceeds a threshold; generating a computer program that is configured to perform the task responsive to the score exceeding the threshold; and executing the computer program configured to perform the task responsive to generating the computer program. In some embodiments, generating the computer program comprises generating a computer program that is configured to perform the task at least in part by controlling one or more other computer programs.

According to at least one aspect, at least one non-transitory computer-readable storage medium is provided. The at least one non-transitory computer-readable storage medium stores processor-executable instructions that, when executed by at least one processor, cause the at least one processor to perform: receiving an indication of an action being performed by the user on a computing device; causing the computing device to wait before updating a user interface of the computing device responsive to the action performed by the user; gathering contextual information associated with the action while the computing device is waiting to update the user interface responsive to the action performed by the user; causing the computing device to update the user interface responsive to the action performed by the user; and storing information indicative of the action and the contextual information.

According to at least one aspect, a system is provided. The system comprises a first computing device comprising at least one hardware processor and at least one non-transitory computer-readable storage medium storing processor-executable instructions that, when executed by the at least one hardware processor, cause the at least one hardware processor to perform: receiving an indication of an action being performed by a user on the first computing device; causing the first computing device to wait before updating a user interface of the first computing device responsive to the action performed by the user; gathering contextual information associated with the action while the first computing device is waiting to update the user interface responsive to the action performed by the user; causing the first computing device to update the user interface responsive to the action performed by the user after gathering the contextual information; and transmitting information indicative of the action and the contextual information as an event in an event log including a plurality of events. The system may further comprise a second computing device in communication with the first computing device and comprising at least one hardware processor and at least one non-transitory computer-readable storage medium storing processor-executable instructions that, when executed by the at least one hardware processor, cause the at least one hardware processor to perform: receiving the event log comprising the plurality of events; clustering the plurality of events to generate a plurality of clustered events; identifying a plurality of sub-tasks in the plurality of clustered events that each comprise a sequence of one or more clustered events at least partially repeated in the plurality of clustered events; identifying a task in the plurality of clustered events being performed by the user that comprises at least one sub-task from the plurality of sub-tasks; and generating a score for the task indicative of a difficulty of automating the task.

In some embodiments, identifying the task comprises: receiving an indication of a first sub-task and a second sub-task of the plurality of sub-tasks that is part of the task; and providing the first sub-task, the second sub-task, and at least one clustered event from the plurality of clustered events that occurs between the first sub-task and the second sub-task in at least one instance in the plurality of clustered events as an input to a recurrent neural network. In some embodiments, identifying the task comprises: using the recurrent neural network to obtain an output that is indicative of a sequence of two or more clustered events that define the task and comprises the first sub-task and the second sub-task.

In some embodiments, the processor-executable instructions further cause the at least one hardware processor in the second computing device to perform: determining whether the score exceeds a threshold; generating a first computer program that is configured to perform the task responsive to the score exceeding the threshold; and executing the first computer program configured to perform the task responsive to generating the first computer program. In some embodiments, the task comprises a first sub-task and a second sub-task of the plurality of sub-tasks and wherein the first computer program is configured to control a second computer program to perform the first sub-task and control a third computer program to perform the second sub-task.

According to at least one aspect, a system is provided. The system comprises: at least one hardware processor; and at least one non-transitory computer-readable storage medium storing processor-executable instructions that, when executed by the at least one hardware processor, cause the at least one hardware processor to perform: receiving a plurality of events each indicative of an action performed by a user on a computing device and contextual information associated with the action performed by the user; clustering the plurality of events to generate a plurality of clustered events; identifying a plurality of sub-tasks in the plurality of clustered events that each comprise a sequence of one or more clustered events at least partially repeated in the plurality of clustered events; identifying a task in the plurality of clustered events being performed by the user that comprises at least one sub-task from the plurality of sub-tasks; and generating a score for the task indicative of a difficulty of automating the task.

In some embodiments, identifying the plurality of sub-tasks comprises identifying a sequence of two or more clustered events that repeat at least a threshold number of times in the plurality of clustered events.

In some embodiments, identifying the plurality of sub-tasks comprises identifying a sequence of two or more clustered events where a portion of the sequence of two or more clustered events repeats at least a threshold number of times.

In some embodiments, identifying the task comprises receiving an indication of a first sub-task of the plurality of sub-tasks that is part of the task and providing the first sub-task and at least one clustered event from the plurality of clustered events temporally adjacent the first sub-task in at least one instance in the plurality of clustered events as an input to a statistical model. In some embodiments, identifying the task comprises using the statistical model to obtain an output that is indicative of a sequence of two or more clustered events that define the task and comprises the first sub-task. In some embodiments, the statistical model is a neural network.

In some embodiments, the processor-executable instructions further cause the at least one hardware processor to perform: determining whether the score exceeds a threshold; generating a first computer program that is configured to perform the task responsive to the score exceeding the threshold; and executing the first computer program configured to perform the task responsive to generating the first computer program. In some embodiments, the first computer program is configured to perform the task at least in part by controlling one or more other computer programs. In some embodiments, the first computer program is configured to control the one or more other computer programs through at least one graphical user interface (GUI) of the one or more other computer programs. In some embodiments, the task comprises a first sub-task and a second sub-task of the plurality of sub-tasks and wherein the first computer program is configured to control a second computer program to perform the first sub-task and control a third computer program to perform the second sub-task.

In some embodiments, the score is generated using at least one value selected from the group consisting of: a number of applications that are employed to perform the task, a number of keystrokes performed in the task, a number of clicks performed in the task, and a ratio between keystrokes and clicks performed in the task.

In some embodiments, the processor-executable instructions further cause the at least one hardware processor to perform: removing at least one event from the plurality of events that is not associated with the task performed by the user. In some embodiments, removing the at least one event includes removing events from the plurality of events that are associated with a predetermined list of web domains.

In some embodiments, the action includes a keystroke or a click.

In some embodiments, the contextual information includes information regarding a state of the user interface when the user performed the action. In some embodiments, the information regarding the state of the user interface includes at least one of: a name of an active application, a title in a title bar of the active application, a value in at least one field of the active application, a size of a window of the active application, and a location of the window of the active application.

In some embodiments, receiving the plurality of events comprises detecting an event from the plurality of events at least in part by: receiving an indication of an action being performed by the user on the computing device; causing the computing device to wait before updating a user interface on the computing device in response to the action performed by the user; gathering contextual information associated with the action while the computing device is waiting to process the action performed by the user to update the user interface; causing the computing device to update the user interface in response to the action performed by the user after gathering the contextual information; and storing information indicative of the action and the contextual information as the event.

According to at least one aspect, a method, performed by a computing device, for discovering automatable tasks is provided. The method comprises: receiving a plurality of events each indicative of an action performed by a user on a computing device and contextual information associated with the action performed by the user; clustering the plurality of events to generate a plurality of clustered events; identifying a plurality of sub-tasks in the plurality of clustered events that each comprise a sequence of one or more clustered events at least partially repeated in the plurality of clustered events; identifying a task in the plurality of clustered events being performed by the user that comprises at least one sub-task from the plurality of sub-tasks; and generating a score associated with the task indicative of a difficulty of automating the task.

In some embodiments, identifying the plurality of sub-tasks comprises identifying a sequence of two or more clustered events that repeat at least a threshold number of times in the plurality of clustered events.

In some embodiments, identifying the task comprises receiving an indication of a first sub-task of the plurality of sub-tasks that is part of the task and providing the first sub-task and at least one clustered event from the plurality of clustered events temporally adjacent the first sub-task in at least one instance in the plurality of clustered events as an input to a statistical model.

According to at least one aspect, at least one non-transitory computer-readable storage medium is provided. The at least one non-transitory computer-readable storage medium stores processor-executable instructions that, when executed by at least one processor, cause the at least one processor to perform: receiving a plurality of events each indicative of an action performed by a user on a computing device and contextual information associated with the action performed by the user; clustering the plurality of events to generate a plurality of clustered events; identifying a plurality of sub-tasks in the plurality of clustered events that each comprise a sequence of one or more clustered events at least partially repeated in the plurality of clustered events; identifying a task in the plurality of clustered events being performed by the user that comprises at least one sub-task from the plurality of sub-tasks; and generating a score associated with the task indicative of a difficulty of automating the task.

According to at least one aspect, a system is provided. The system comprises at least one hardware processor; a display coupled to the at least one hardware processor and configured to display a user interface; and at least one non-transitory computer-readable storage medium storing processor-executable instructions that, when executed by the at least one hardware processor, cause the at least one hardware processor to perform: receiving an indication of an action being performed by a user on the system; gathering contextual information associated with the action; and storing information indicative of the action and the contextual information.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

DETAILED DESCRIPTION

Figure 1A:
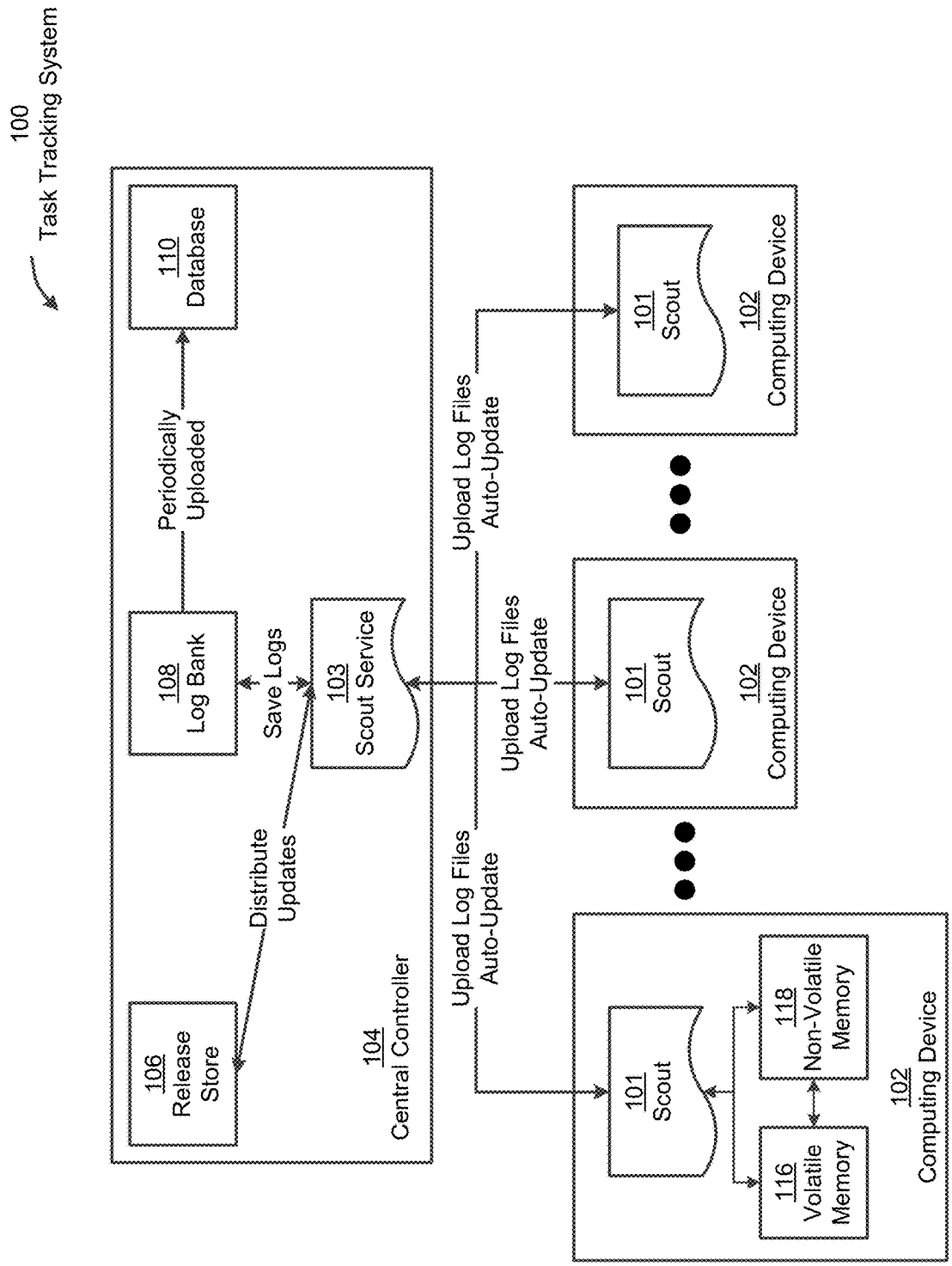
FIGS. 1A and 1B are diagrams showing an example task tracking system, according to some embodiments of the technology described herein.

The inventors have appreciated that conventional user monitoring applications for tracking user interaction with a computer fail to identify a particular task that a user is performing on the computer or gather information about how the task is being performed. For example, a keystroke logger application gathers computer usage data at too low a level to provide meaningful information. Distinguishing between a user providing code snippets on an online forum to assist other software developers and the user developing source code for a particular project using only a text file containing a string of depressed keys may be challenging or impossible. The string of characters in the text file also does not include information regarding how the task was performed such as how long the task took, how many actions were performed to complete the task, and what applications were used to complete the task.

Further, the inventors have appreciated that conventional user monitoring applications may undesirably capture sensitive information about the user that is unrelated to any underlying task being performed by the user. Examples of such sensitive information include personal bank account numbers, passwords, and/or text of personal emails. For example, a user may log into to their personal email account and a keystroke logger application may inadvertently capture the username and password for the personal email account of the user. In this example, any individual with access to the logged keystrokes generated by the keystroke logger application could obtain the login credentials for the user and hijack the user's personal email account.

Still yet further, the inventors have appreciated that conventional user monitoring applications which track user interaction through the use of periodic questions posed to the user may generate inaccurate information. For example, a user may be incentivized to: (1) provide false information in response to posed questions to make themselves appear more productive; (2) provide short and incomplete responses to posed questions to reduce the amount of time spent responding to posed questions; and/or (3) ignore the posed questions altogether to maximize their productivity. For illustration, an application may pose the question "what are you working on now" and the user may simply respond with "a project for work." Such a response from the user omits key information because the response does not provide information regarding the particular project that is being completed or how the user is completing the project.

Accordingly, the inventors have conceived and developed new technology that improves upon conventional user monitoring applications, which technology constitutes an improvement in a computer-related technology of user monitoring. For example, systems and methods for generating computer usage data that may be employed to identify the particular task(s) performed by a user are described herein. In some embodiments, the computer usage data may contain both an indication of an action performed by a user (e.g., a keystroke or a click) and contextual information associated with the performed action. The contextual information may include, for example, information regarding a state of a user interface of the computing device when the action was performed such as: a name of an active application, a title in a title bar of the active application, a document object model (DOM) for an active document (e.g., an HTML, XHTML, or XML document) and/or a web-address in an address bar of a web-browser. Pairing information indicative of an action performed by the user with contextual information associated with the action may advantageously provide more insight regarding the task being performed by a user than keystroke data alone. For example, the problem of distinguishing between a user providing code snippets on an online forum to assist other software developers and the user developing source code for a particular project may be readily solved by analyzing contextual information indicative of the particular application being used by the user. In this example, the contextual information regarding the particular application that is active would show the user interacting with a web-browser at a particular web-address while providing code snippets on the online forum and show the user interacting with an integrated development environment (IDE) software application while developing source code.

In some embodiments, one or more components of the computer usage data may be genericized. For example, a depression of any character key (e.g., a key associated with a letter, a number, or a symbol) may be represented in the same way in the computer usage data (e.g., all depressions of character keys are identified just as "keystrokes"). Genericizing one or more components of the computer usage data may advantageously reduce the risk of capturing personal information of a user relative to convention user monitoring applications, such as key logger applications. For example, a user may enter a password "Carrot23" into a web-browser application to access a personal email account. In contrast to conventional key logger applications that would store the entire password "Carrot23," the computer usage data generated in accordance with the techniques described herein may comprise an indication that eight keystrokes occurred in a web-browser application without information regarding which character keys were depressed. Thereby, information regarding the password of the user is not collected as part of the computer usage data.

The inventors have further appreciated that the collected computer usage data may be very noisy because human users rarely perform a task from start-to-finish without being interrupted. Thereby, the collected computer usage data commonly comprises multiple tasks that are interleaved with each other. For example, an information technology professional may start a task of resetting a password and be distracted by a pop-up from a social media application. Once the user has responded to the pop-up, the user may return to the task of resetting the password. In this example, the computer usage data may comprise a mixture of events associated with the task of resetting a password interspersed with unrelated events associated with a social media application. As a result of this noise in the computer usage data, direct application of conventional data analysis techniques (e.g., machine learning techniques) may be ineffective at identifying underlying tasks in the computer usage data because such techniques would be confounded by the presence of data associated with events unrelated to the tasks.

Accordingly, the inventors have developed new techniques to analyze the noisy computer usage data collected for a user to accurately identify the underlying tasks being performed by the user. In some embodiments, the underlying task performed by a user may comprise a plurality of sub-tasks. For example, the task of creating a computer program may comprise a first sub-task of searching for source code examples (e.g., using a web-browser) and a second sub-task of developing source code (e.g., using an IDE). Each of the sub-tasks in a given task may comprise a sequence of one or more actions performed by a user. For example, the task of searching for source code examples may comprise: (1) one or more actions to open a web-browser; (2) one or more actions to navigate to a domain for a source code repository; and (3) one or more actions to access a source code example in the source code repository. Thereby, the systems described herein may analyze the captured events (e.g., actions and the contextual information associated with the actions) to infer the sub-tasks being performed and combine one or more of the identified sub-tasks to identify a higher-level task being performed by the user.

In some embodiments, a sub-task may be identified by clustering the plurality of events and identifying sequences of one or more clustered events that at least partially repeat. The detected events in the computer usage data may be clustered such that similar detected events are assigned to the same cluster. Thereby, events that appear the same from the perspective of the user (e.g., a click on the close button of a particular application) may be grouped together despite having small variations in contextual information (e.g., a click on the close button in one instance occurred at a different location on a display screen than in another instance). The clustered events may then be analyzed to identify sub-tasks in the clustered events by identifying sequences of one or more clustered events (e.g., sequences of 1, 2, 3, 4, 5, or 6 clustered events) that repeat a threshold number of times in the computer usage data. The sequences of clustered events may fully repeat a threshold number of times (e.g., the exact sequence repeats a threshold number of times) or partially repeat a threshold number of times (e.g., a portion of the sequence repeats a threshold number of times).

In some embodiments, the higher-level task being performed by the user may be identified by combining one or more identified sub-tasks with one or more other clustered events (e.g., clustered events in other sub-tasks) together. Thereby, a sequence of one or more clustered events that defines the task (and comprises the clustered events in at least one sub-task) may be identified. For example, the sub-tasks may be assigned to one or more higher-level tasks and clustered events that occur near the sub-tasks in at least one instance in the computer usage data may be analyzed to determine the sequence of one or more clustered events that defines the task. In one implementation for illustration, a label may be added to a sub-task indicative of which task the sub-task belongs and clustered events that occur temporally adjacent the sub-task (e.g., directly preceding or proceeding the sub-task) in at least one instance in the plurality of clustered events may be analyzed to determine whether these clustered events belong to the same task as the sub-task or to a different task. Thereby, the sequence of one or more clustered events that define the task may be identified.

The computer programs for collecting computer usage data and analyzing the gathered computer usage data may be deployed in, for example, large corporations to gain insight into how employees spend their time on a given day. For example, the collected computer usage data may be analyzed to determine how much time employees are spending on tasks (e.g., reading e-mail, writing e-mail, not working, writing software code, reading the content of a webpage, providing input to a webpage, accessing a particular website or websites, accessing a database, working in a spreadsheet, etc.), identifying manual and/or repetitive tasks (e.g., a set of one or more actions that a user repeatedly takes) which may be automated, and measuring effort (e.g., time, number of applications required to perform the task, and/or number of actions required to perform the task) spent on certain tasks.

In some embodiments, the identified tasks performed by one or more employees of a business may be automatically evaluated for automating using software. For example, the information collected may be employed to create software robot computer programs (hereinafter, "software robots") that are configured to programmatically control one or more other computer programs (e.g., one or more application programs and/or one or more operating systems) to perform one or more tasks at least in part via the graphical user interfaces (GUIs) and/or application programming interfaces (APIs) of the other computer program(s). For example, an automatable task may be identified from the collected computer usage data and a software developer may create a software robot to perform the automatable task. In another example, all or any portion of a software robot configured to perform the automatable task may be automatically generated by a computer system based on the collected computer usage information. Some aspects of software robots are described in U.S. Patent Publication No. 2016-0259651, titled "SOFTWARE ROBOTS FOR PROGRAMMATICALLY CONTROLLING COMPUTER PROGRAMS TO PERFORM TASKS," published on Sep. 8, 2016, which is incorporated herein by reference in its entirety.

It should be appreciated that the valuable information regarding the particular tasks that employees are performing on a computer may be employed for any of a variety of purposes. In some embodiments, the information regarding the particular tasks performed by employees may be used to track the time spent on particular projects and, thereby, inform management as to the true cost of a project. For example, a software development company may track the time spent by each developer on a particular project to monitor the cost of completing each project. In other embodiments, the information may be employed to identify tasks that are frequently performed by employees and assess the economic viability of automating the task. For example, the cost of creating a software robot to perform the task may be compared with the cost of having employees perform the task. In yet other embodiments, the information may be employed to monitor the time required to perform a particular task. For example, the time required by a purchasing manager to create a purchase order may be identified.

Example Implementation

Some aspects of the technology described herein relate to computer software for monitoring user interaction with a computing device (referred to herein as "Scout"). Scout may include one or more constituent computer programs and/or software routines written in any programming language(s), such as Java, C++, C#, C, and Python. It should be appreciated that Scout may be implemented to perform any combination of the functions described herein as being attributed to Scout (e.g., performed by Scout). Thereby, Scout may be implemented to perform fewer (or more) functions than those described herein as being attributed to Scout.

In some embodiments, Scout may be installed on a computing device and track user interaction with the computing device. The computing device may include various input/output devices to facilitate user interaction with the computing device such as a display to present a user interface, a mouse or touch screen to navigate the user interface, and/or a keyboard to enter characters into the user interface. The computing device may include a non-transitory computer-readable storage medium that stores Scout and a hardware processor that may execute instructions from Scout stored in the non-transitory computer-readable storage medium. The instructions in Scout may cause the hardware processor to perform various functions to capture information indicative of a user's interaction with the computing device such as clicks (e.g., mouse clicks, taps on a touch screen, etc.) and keystrokes in addition to contextual information regarding each user action such as a state of the user interface. The information indicative of a user's interaction with the computing device may be stored as an event. An event may be, for example, a piece of data (e.g., a piece of structured data) that stores information related to input provided by the user (e.g., a click, a keystroke, etc.) and information about the context in which the input was provided (e.g., the application that received the input, the state of the application when it received the input, information indicating which of one or more other application programs was active when the input was provided, the state of the operating system when the input was provided, etc.).

In some embodiments, Scout may receive an indication of an action being performed by a user on the system. In these embodiments, Scout may cause (e.g., indirectly or directly) the computing device to wait before updating the user interface responsive to the action performed by the user. Thereby, information regarding a state of the user interface may be captured before the user interface is updated responsive to the action. For example, Scout may gather contextual information associated with the action while the computing device is waiting to update the user interface. Otherwise, a race would be created between the user interface being updated and Scout trying to gather the contextual information. Thereby, Scout could inadvertently gather contextual information for a given action that is associated with a different user interface state than the state in which the action occurred (e.g., in instances where Scout loses the race). The contextual information may be information associated with a state of the user interface. For example, the contextual information may include information regarding a state of an active application, a title in a title bar of the active application, a value in at least one field of the active application, a size of a window of the active application, a location of the window of the active application, and a DOM for an active document. Scout may cause (e.g., indirectly or directly) the computing device to update the user interface responsive to the action performed by the user once the contextual information has been gathered.

In some embodiments, Scout may gather the contextual information while the computing device is waiting to update the user interface within a threshold amount of time.

Thereby, a user may not perceive a delay between performing an action and seeing the computing device respond to the action. For example, a user may be unable to perceive delays of less than 100 milliseconds (ms). In this example, the threshold may be less than or equal to 100 ms (e.g., 5 ms, 10 ms, 15 ms, 20 ms, 25 ms, 30 ms, 35 ms, 40 ms, 45 ms, 50 ms, 55 ms, 60 ms, 65 ms, 70 ms, 75 ms, 80 ms, 85 ms, 90 ms, 95 ms, and 100 ms). Scout may gather the contextual information within the threshold period of time by, for example, gathering selected contextual information that is capable of being gathered within the threshold period of time.

In some embodiments, Scout may store computer usage data in volatile memory, and store only a subset of the computer usage data in non-volatile memory so as to avoid storing certain types of information (e.g., private, personalized, or other sensitive information) in non-volatile memory. Volatile memory may be any computer memory that uses power to maintain the information stored therein (e.g., random access memory (RAM), a processor cache, etc.). Non-volatile memory may be any computer memory that retains the data stored therein while powered off (e.g., a disk drive, a ready only memory (ROM), an optical disk, etc.). For example, Scout may store computer usage data (e.g., the contextual information and the information indicative of one or more actions) in volatile memory (e.g., as part of a queue or any other suitable data structure). In this example, Scout may copy computer usage data from the non-volatile memory to the event queue as new computer usage data is generated. It should be appreciated that Scout may filter the computer usage data being added to the non-volatile memory to remove portions of the computer usage data that may contain personal information of the user before the computer usage data is stored in non-volatile memory. For example, Scout may analyze the computer usage data stored in volatile memory to determine whether the computer usage data includes personal information of the user. Example personal information includes information indicative of: a bank account of the user, a personal email account of the user, and a social media account of the user. Scout may move the computer usage data from volatile memory to non-volatile memory responsive to the computer usage data not containing personal information. Otherwise, Scout may delete the computer usage data from volatile memory to protect the privacy of the user. Thereby, the computer usage data containing personal information is prevented from being written to non-volatile memory of the computing device.

The inventors have appreciated that the computer usage data collected by Scout may include various patterns that may be extracted to identify one or more tasks being performed by a user is performing on the computing device from which the computer usage data is gathered. For example, a user may switch between using a web browser and an integrated development environment application, which may indicate that the user is developing software.

Accordingly, aspects of the technology described herein relate to computer software for gathering and processing the computer usage data generated by instances of Scout running on computing devices to identify automatable tasks (referred to herein as "Scout Service"). Scout Service may include one or more constituent computer programs and/or software routines written in any programming language(s), such as Java, C++, C#, C, and Python. It should be appreciated that Scout Service may be implemented to perform any combination of the functions described herein as being attributed to Scout Service (e.g., performed by Scout Service). Thereby, Scout Service may be implemented to perform fewer (or more) functions than those described herein as being attributed to Scout Service.

In some embodiments, Scout Service may be implemented as one or more computer programs that may be executed on one or more computing devices. For example, Scout Service may be implemented as a network application that is accessible over the Internet and is executed by at least one server. The server may include, for example, a communication interface to communicate with one or more computing devices running instances of Scout. Scout Service may receive computing usage information from instances of Scout running on computing devices and also push software updates to these Scout instances. The server(s) may further include at least one non-transitory computer-readable storage medium storing Scout Service and one or more hardware processors that may execute the instructions from Scout Service stored in the non-transitory computer-readable storage medium or media. The instructions in Scout Service may cause the hardware processor(s) to perform various functions to gather and analyze computer usage data to identify automatable tasks.

In some embodiments, Scout Service may receive, via the communication interface, an event log including a plurality of events from at least one computing device running Scout. Each of the plurality of events may include information indicative of an action a performed by a user on the respective computing device (e.g., an input to the computing device performed by the user such as a click and a keystroke) and contextual information associated with the action performed by the user. The events and/or event logs may be, for example, pieces of data (e.g., structured data) stored in any suitable format using any suitable data structure(s) using any suitable programming language.

In some embodiments, Scout Service may analyze the plurality of events to identify one or more tasks being performed by the user. A task may be, for example, a sequence of one or more user interactions with a computing device across one or more applications programs that culminates in an objective being completed. Non-limiting examples of objectives include resetting a password, creating a purchase order, processing payroll, and creating a document. When a user uses multiple application programs to perform a single task, the task may be considered as being composed of multiple sub-tasks, each of the multiple sub-tasks comprising actions performed by using a respective one of the multiple application programs. Thereby, sub-tasks may, in some embodiments, involve user interaction with only a single software application. For example, a user may interact with a computing device to create a legal document by performing a first sub-task of using a web-browser to perform legal research and a second sub-task of using a word processing software application to generate the text of the legal document. Some tasks, however, may involve only a single software application on the computing device. For example, a user may interact with a computing device to process payroll for a company and only use an accounting software application to process the payroll.

Scout Service may identify a task being performed by a user based on a plurality of events using any of a variety of techniques. In some embodiments, Scout Service may cluster the plurality of events to generate a plurality of clustered events. Scout Service may cluster the plurality of events by, for example, identifying a plurality of clusters in the plurality of events and assigning at least some of the plurality of events to the plurality of clusters. Any of a variety of clustering techniques may be employed such as: connectivity-based clustering, centroid-based clustering, distribution-based clustering, and/or density-based clustering. The clustered plurality of events may be analyzed to identify sequences of one or more clustered events that at least partially repeat in the plurality of clustered events as sub-tasks. For example, a sequence of one or more clustered events that fully repeats a threshold number of times may be identified as a sub-task. In another example, a sequence of one or more clustered events that partially repeats a threshold number of times may be identified as a sub-task. The identified sub-tasks may be employed to, for example, identify a higher-level task being performed by the user. For example, Scout Service may receiving an indication of which task a sub-task belongs and employ that information to identify clustered events that are temporally adjacent the sub-task in at least one instance in the plurality of events that belong to the same task as the sub-task.

Once Scout Service has identified a task, Scout Service may generate a score for the task that is indicative of a difficulty of automating the task (e.g., an automation score). For example, Scout Service may analyze the identified task to calculate one or more values regarding the task such as: an estimated cost of developing a software robot to automate the task, an estimated amount of developer hours to create the software robot to automate the task, a number of applications that are employed to perform the task, a number of keystrokes performed in the task, and a ratio between keystrokes and clicks performed in the task. The calculated values may be, in turn, employed to generate the automation score. For example, the automation score may be a linear combination of one or more of the calculated items.

It should be appreciated that the embodiments described herein may be implemented in any of numerous ways. Examples of specific implementations are provided below for illustrative purposes only. It should be appreciated that these embodiments and the features/capabilities provided may be used individually, all together, or in any combination of two or more, as aspects of the technology described herein are not limited in this respect.

Example System Architectures

Figure 1B:
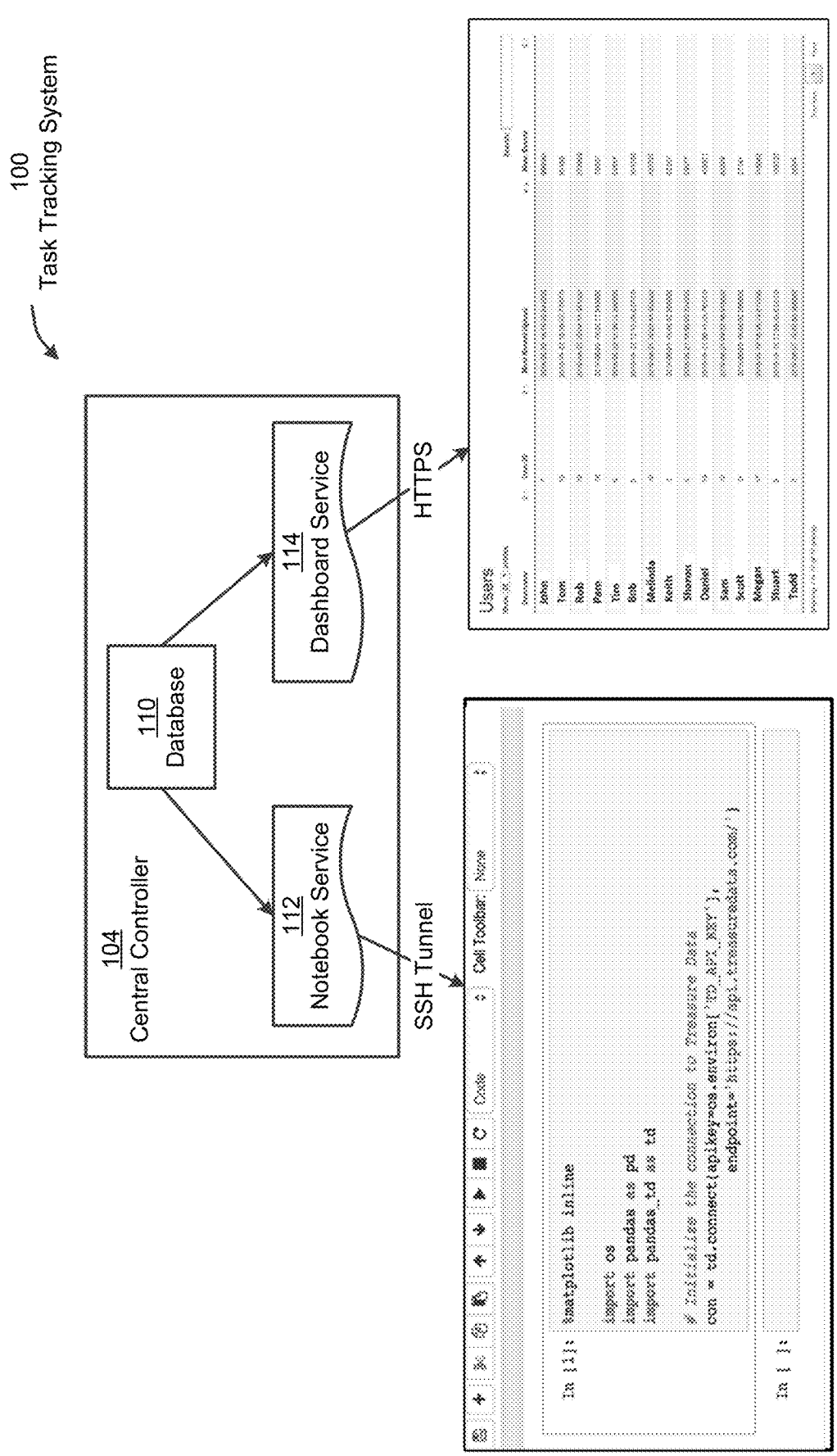

FIGS. 1A and 1B show an example task tracking system 100, according to some embodiments. The task tracking system 100 is suitable to track the tasks being performed by users on a plurality of computing devices 102. Each of the computing devices 102 may comprise a volatile memory 116 and a non-volatile memory 118 and execute an instance of Scout 101 that tracks user interaction with the respective computing device 102. Scout 101 may be, for example, implemented as a software application and installed on an operating system, such as the WINDOWS operating system, running on the computing device 102. In another example, Scout 101 may be integrated into the operating system running on the computing device 102. As shown in FIG. 1A, the tracking system 100 further includes a central controller 104 that may be a computing device, such as a server, including a release store 106, a log bank 108, and a database 110. The central controller 104 may execute an instance of Scout Service 103 that gathers the computer usage information collected from the instances of Scout 101 and stores the collected information in the database 110. As shown in FIG. 1B, Scout Service 103 may also include services to provide access to the stored computer usage information in the database 110 including, for example, a notebook service 112 (e.g., an interactive computational environment such as the Jupyter Notebook) and/or a dashboard service 114 (e.g., a visual representation of the stored events accessible over the internet). Scout Service 103 may be implemented in any of a variety of ways including, for example, as a web-application. In some embodiments, Scout Service 103 may be a python Web Server Gateway Interface (WSGI) application that is exposed as a web resource to the instances of Scout 101 running on the computing devices 102.

In some embodiments, Scout 101 may monitor the particular tasks being performed on the computing device 102 on which it is running. For example, Scout 101 may monitor the task being performed by monitoring keystrokes and/or clicks and gathering contextual information associated with each keystroke and/or click. The contextual information may include information indicative of the state of the user interface when the keystroke and/or click occurred. For example, the contextual information may include information regarding a state of the user interface such as the name of the particular application that the user interacted with, the particular button or field that the user interacted with, and/or the uniform resource locator (URL) link in an active web-browser. The contextual information may be leveraged to gain insight regarding the particular task that the user is performing. For example, a software developer may be using the computing device 102 develop source code and be continuously switching between an application suitable for developing source code and a web-browser to locate code snippets. Unlike traditional keystroke loggers that would merely gather a string of depressed keys including bits of source code and web URLs, Scout 101 may advantageously gather useful contextual information such as the particular active application associated with each keystroke. Thereby, the task of developing source code may be more readily identified in the collected data by analyzing the active applications.

The data collection processes performed by Scout 101 may be seamless to a user of the computing device 102. For example, Scout 101 may gather the computer usage data without introducing a perceivable lag to the user between when an action is performed and when the user interface is updated. Further, Scout may automatically store the collected computer usage data in the volatile memory 116 and periodically (or aperiodically or according to a pre-defined schedule) transfer portions of the collected computer usage data from the volatile memory 116 to the non-volatile memory 118. Thereby, Scout 101 may automatically upload captured information in the form of log files from the non-volatile memory 118 to Scout Service 103 and/or receive updates from Scout Service 103. Accordingly, Scout may be completely unobtrusive on the user experience.

In some embodiments, the instance of Scout 101 running on each computing device 102 may upload log files to Scout Service 103 that include computer usage information such as information indicative of actions performed by a user on the respective computing device 102 and contextual information associated those actions. Scout Service 103 may, in turn, receive these log files and store the log files in the log bank 108. Scout Service 103 may also periodically upload the logs in the log bank 108 to a database 110. It should be appreciated that the database 110 may be any type of database including, for example, a relational database such as PostgreSQL. Further, the events stored in the database 110 and/or the log bank 108 may be stored redundantly to reduce the likelihood of data loss from, for example, equipment failures. The redundancy may be added by, for example, by duplicating the log bank 108 and/or the database 110.

In some embodiments, Scout Service 103 may distribute software updates to instances of Scout 101 running on each of the computing devices 102. For example, an instance of Scout 101 may request information regarding the latest software updates that are available. In this example, Scout Service 103 may respond to the request by reading information from the release store 106 to identify the latest software updates and provide information indicative of the latest software update to the instance of Scout 101. If the instance of Scout 101 returns with a request to download the latest version, the Scout Service 103 may retrieve the latest software update from the release store 106 and provide the latest software update to the instance of Scout 101.

In some embodiments, Scout Service 103 may implement various security features to ensure that the data that passes between Scout Service 103 and one or more instances of Scout 101 is secure. For example, a Public Key Infrastructure may be employed by which each instance of Scout 101 must authenticate itself using a client certificate to access any part of the Scout Service 103. Further, the transactions between Scout 101 and Scout Service 103 may be performed over HTTPS and thus encrypted.

Scout Service 103 may make the collected computer usage information in the database 110 available to users. In some embodiments, the Scout Service 103 may include a notebook service 112 that presents an interactive computational environment to a user in which the user can type commands to manipulate and/or visualize the computer usage data in the database 100. The notebook service 112 may be provided to a user over, for example, a secure shell (SSH) tunnel. The particular notebook service 112 employed may vary depending upon the implementation. For example, the notebook service 112 may be a Jupyter Notebook and use various python data processing packages such as pandas, numpy, matplotlib and bokeh. In other embodiments, the Scout Service 103 may include a dashboard service 114 that provides a visual representation of the information stored in the database 110. For example, the dashboard service 114 may be a series of user interface screens that permit a user to interact with the computer usage data in the database 110. These user interface screens may be accessible over the internet using, for example, HTTPS. It should be appreciated that the Scout Service 103 may provide access to the data in the database 110 through still yet other ways. For example, Scout Service may accept queries through a command-line interface (CLI), such as psql, or a graphical user interface (GUI), such as pgAdmin.

Example Data Collection Techniques

As discussed herein, Scout may be designed to collect computer usage data. For example, Scout may collect information indicative of a particular action performed (e.g., a click or a keystroke) and contextual information regarding a state of the user interface (e.g., a state of the active application in the user interface). Scout may advantageously gather the contextual information regarding a state of the user interface before the computing device updates the user interface in response to receive a command. For example, a user may click on an "OK" button in a dialog box to close the dialog box. In this example, Scout may gather contextual information regarding the dialog box before the dialog box is closed. In some embodiments, Scout may gather contextual information indicative of a state of the user interface before the user interface is updated by intercepting user actions before they reach the target application. Thereby, Scout may cause the computing device to wait to update the user interface while contextual information regarding the particular action may be gathered.

Scout may intercept user actions through any of a variety of methods. In some embodiments, Scout may use hooks such as those available through the WINDOWS Automation API in the WINDOWS operating systems. These hooks may be, for example, points in the system message-handling mechanism where an application can install a subroutine to monitor the message traffic in the system and process certain types of messages before they reach the target window procedure. For example, Scout may install a hook in the operating system to call one or more functions when an action is detected to gather the appropriate contextual information. Once the functions have gathered the appropriate contextual information, Scout may allow the operating system to provide the action to the target application and cause the user interface to update.

An example diagram illustrating a process for collecting computer usage data is shown in FIG. 2. As shown, an operating system 202 identifies actions performed by a user on the computing device, such as keyboard commands 204 and/or mouse commands 206. As discussed above, a hook may be installed that triggers Scout to gather information indicative of the action being performed such as whether the action was a keystroke or a mouse click and gather contextual information regarding the action such as a name of the active application. The gathered contextual information may be stored as an event 208 in an event queue 210. The event queue 210 may be, for example, a first-in first-out (FIFO) queue that is stored in volatile memory (e.g., RAM) of the computing device. After the event 208 has been added to the event queue 210, Scout may permit the operating system 202 to send the action to the target application and, thereby, cause computing device to update the user interface. The last event 208 to be added to the event queue 210 may be removed from the event queue 210 and written to a log 212 in, for example, a non-volatile memory of the computing device.

In some embodiments, Scout may generate the event 208 within a threshold period of time of receiving an indication that an action has been performed. Generating the event 208 with a threshold period of time may advantageously minimize (or eliminate) any perceivable lag for the user between performing an action and the user interface being updated. Thereby, the productivity of users is not negatively impacted by Scout's execution. Scout may generate the event 208 within a threshold period of time by, for example, only gather selected contextual information that may be gathered within the threshold period of time.

In some embodiments, Scout may employ an object hierarchy to gather at least some of the contextual information associated with an action performed by a user. In some embodiments, an object hierarchy may represent the state of the graphical user interfaces visible to the user at the time that the user performed the action. The object hierarchy may comprise a set of one or more objects that correspond to active graphical user elements of a user interface. In this way, an object hierarchy may provide a real-time representation of a user interface as seen by the user. For example, an object hierarchy for a user interface of a computing device that is executing a calculator software application may comprise an object for the calculator software application and a plurality of objects for each of the buttons shown in a GUI of the calculator software application that are children of the object for the calculator software application. Each of the objects may comprise information regarding the location of the respective element in the user interface, such as where the element is located on the screen. Thereby, Scout may cross-reference a location of a screen click with information from the object hierarchy to determine which element on the screen is located at the same location of the screen click. Further, information regarding the clicked element may be gathered (directly or indirectly) from the object hierarchy. Aspects of generating, accessing, refreshing and otherwise using object hierarchies are described in U.S. Patent Publication No. 2016-0259651, titled "SOFTWARE ROBOTS FOR PROGRAMMATICALLY CONTROLLING COMPUTER PROGRAMS TO PERFORM TASKS," published on Sep. 8, 2016, which is incorporated herein by reference in its entirety.

In some embodiments, the object hierarchy needs to be refreshed so that the object hierarchy provides a real-time snapshot of the state of the graphical user interfaces of the computer programs executing on a computing device. For example, as the user interface of a computer program may change over time, the object hierarchy may change over time to reflect at least some of the changes to the user interface. For example, when a user interface of a computer program changes and includes one or more active GUI elements not previously present in the user interface (e.g., in response to a user clicking on a menu to reveal buttons representing menu options), the object hierarchy may be updated to add one or more new objects to the hierarchy that correspond to the new active GUI element(s). As a result, it is desirable to refresh an object hierarchy when using the object hierarchy to gather contextual information for one or more actions performed by a user.

However, the inventors have appreciated that refreshing the entire object hierarchy (for all the active GUI elements) may take time perform such that the user would perceive a delay during the refreshing. For example, Scout may not be able to wait for the entire object hierarchy to be refreshed within a threshold amount of time (e.g., a period of time that is imperceptible to a user, such as, for example, within a 100 ms). Accordingly, in some embodiments, only a portion of the object hierarchy may be refreshed in order to gather contextual information for an action performed by a user. As a result, the object hierarchy may be (at least partially) updated within the threshold period of time. For example, Scout may update the portion of the object hierarchy that is between a root object in the hierarchy and a target object target object that corresponds to the GUI element using which the action was performed and all of the objects from which the target object descended (e.g., parent, grandparent, and/or great grandparent objects). Thereby, other objects in the complete object hierarchy, such as siblings of the target object, are excluded from the root-to-target object hierarchy. As one example, when a user clicks on a button, only the objects on a path from the root of the object hierarchy to the object representing the button may be refreshed. Siblings of the object representing the button may not be refreshed.

It should be appreciated, however, that in some embodiments, Scout may periodically update the entire object hierarchy (e.g., in response to a period of time passing instead of in response to an event). Thereby, the object hierarchy may be updated without introducing a perceivable lag to users between performing an action and the user interface being updated. For example, Scout may only update a portion of an object hierarchy in response to a detected event (e.g., launching of a new application program) and periodically (e.g., every 30 seconds, every minute, every 5 minutes, etc.) update the complete object hierarchy. In this example, Scout may update the object hierarchy without stopping the computing device from updating the user interface in response to an event.

The events 208 may be data structures (e.g., structs) that store information indicative of the action performed and associated contextual information in an organized manner. The particular format of the data structure may vary depending upon, for example, the particular contextual information being gathered. An example data structure for an event 208 including a description of each field is shown below in Table 1:

TABLE 1

Example Event Data Structure

| Name | SQL Format | Description | Example |
| --- | --- | --- | --- |
| number | Integer | Monotonically increasing event number (Key) | 1 |
| Time | DateTime | Time of event | datetime(2016,6,13,1,1,2) |
| Exe | String | Path of active application | C:\Program Files (x86)\Google\Chrome\Application\chrome.exe |
| context | String | Application-specific | https://mail.google.com/mail/u/0/ |
| Title | String | Title bar | Inbox (0) - employee@corporation.com |
| classname | String | Class of windows object | Chrome_WidgetWin_1 |
| window_left | Integer | X-coordinate of left part of window | 0 |
| window_top | Integer | Y-coordinate of top part of window | 0 |
| window_right | Integer | X-coordinate of right part of window | 1928 |
| window_bottom | Integer | Y-coordinate of bottom part of window | 1208 |
| message | String | Type of event | LB_DOWN |
| modifiers | Integer | ALT, SHIFT, CAPS modifiers | 0, 2, 8 |
| x | Integer | X-coordinate of action | 674 |
| y | Integer | Y-coordinate of action | 384 |

As shown in Table 1, the event data structure may include a variety of information. It should be appreciated that events 208 may include all or any portion of the fields shown above in Table 1. Further, the events 208 may include fields not specifically illustrated in Table 1.

As discussed above, Scout is a computer program that may be executed by a computing device. For example, Scout may be a WINDOWS application written in a programming language such as C++ and uses the POCO C++ Library for networking, OpenSSL for TLS/SSL, and the WINDOWS API for system calls. In some embodiments, Scout may be sub-divided into multiple program modules that each perform one or more functions. Sub-dividing Scout into multiple functional modules may, for example, ease the addition of new functionality to Scout. For example, new functionality may be added simply be creating a new module and calling the module. An example sub-division of Scout into multiple modules is shown below in Table 2 with a description of each module:

TABLE 2

Example Modules

| Module Name | Description |
| --- | --- |
| Main | Calls other modules |
| Network | Finds log files on disk and securely uploads them to a Scout Service |
| Log | Removes events from the event queue and writes the events to the log |
| Keyboard | Initializes keyboard hook and processes keystrokes |
| Mouse | Initializes mouse hook and processes clicks |
| Update | Downloads and runs new versions of Scout if they exist |

The main module may be the first module started in Scout. The main module may, for example, check to see if another instance of Scout is running. If another instance of Scout is already running, the new instance of Scout may close so as not to have multiple instances of Scout running simultaneously. The main module may proceed to copy itself to the startup folder, if it hasn't done so already, to ensure that Scout runs each time the computer starts without intervention by the user. The main module may then initialize the event queue (e.g., event queue 210) and call the other modules to perform various functions. An example procedure for the main module is shown below:

| Example Main Module Procedure | |
| --- | --- |
| 1: | Check if another instance is running |
| 2: | Copy itself to startup folder |
| 3: | Initialize Event Queue |
| 4: | Start Modules: log, network, mouse, keyboard, update |

The main module may call the network module that finds log files in a non-volatile memory of the computing device and securely uploads them to Scout Service. The network module may search the non-transitory computer readable medium of the computing device for log files and attempt to securely upload them to Scout Service using, for example, a secure internet connection. If the upload is successful, the network module may delete the log file to make space on the non-transitory computer readable medium of the computing device. Otherwise, the network module may repeat the process to locate another log file to upload. An example procedure for the network module is shown below:

| Example Network Module Procedure | |
| --- | --- |
| 1: | Find the log files |
| 2: | For each log file, try to securely upload it |
| 3: | If upload successful, delete log file |
| 4: | Sleep for a predetermined amount of time |
| 5: | Return to 1 |

The main module may also call the log module to remove events from the event queue (e.g., event queue 210) and writes the events to the log (e.g., log 212). The log module may create a log file in a non-volatile memory of the computing device and acquire an event queue lock to stop other functions from changing the event queue. The log module may pop an event off the queue and release the event queue lock. The log module may then print the event to the log file. If it is the appropriate time to start a new log file (e.g., the log file has reach a predetermined size), the log module may close the log file and create a new log file. An example procedure for the log module is shown below:

| Example Log Module Procedure | |
| --- | --- |
| 1: | Create a log file |
| 2: | Wait to acquire the event queue lock |
| 3: | Pop an event off the queue |
| 4: | Release the event queue lock |
| 5: | Prints the event to the file |
| 6: | If it's not time to rollover the log file, return to 2. |
| 7: | Close the log file |
| 8: | Create a new log file |

The main module may also call the mouse module that initializes mouse hook and processes clicks and/or the keyboard module that initializes keyboard hook and processes keystrokes. Each of the mouse and keyboard modules may register a hook for their respective mouse and keyboard events and wait for the hook to be called. Once the hook is called, the hook function that has been called is locked to avoid multiple instances of the hook function running. While the hook function is locked and the computing device is waiting to send the mouse or keyboard action to the target application, information regarding the action (e.g., whether the left or right mouse button was clicked) and contextual information (e.g., a name of the active application) may be extracted. The extracted information may be stored as an event in the event queue. After the event has been added to the event queue, the hook may be released and, thereby, allow the action to be passed on to the target application. An example procedure for the mouse and keyboard modules is shown below:

| Example Mouse/Keyboard Procedure | |
| --- | --- |
| 1: | Register hook to intercept mouse/keyboard events |
| 2: | Wait for hook subroutine to be called |
| 3: | Lock mouse/keyboard_hook so there is one instance of the mouse/keyboard_hook running |
| 4: | Extract information about the mouse/keyboard action |
| 5: | Extract the contextual information |
| 6: | Store event in the event queue |
| 7: | Unlock mouse/keyboard_hook |

The main module may also call the update module that downloads and runs new versions of Scout if they exist. The update module may periodically or aperiodically ask Scout Service (e.g., via message transmitted to Scout Service) for an indication of the latest version of Scout. The update module may compare a response from Scout Service as to what version is the latest version of Scout with the currently installed version of Scout. If the current version is not up-to-date, the update module downloads the latest version and performs one or more checks to ensure that the downloaded version has not been corrupted. Once the new version of Scout has been downloaded, the update module may write the new Scout binary to the startup folder and spawn a new instance of Scout and terminate the current instance. An example procedure for the update module is shown below:

| Example Update Procedure |
| --- |
| 1: At a random interval, ask Scout Service for the latest version on the network |
| 2: If the version is same as the current version, return to 1 |
| 3: Download the latest version |
| 4: Check the cryptographic hash sum matches the new version. |
| 5: Write the new Scout binary to the startup folder. |
| 6: Spawn the new Scout binary. |
| 7: Terminate the log module |
| 8: Terminate the current process |

It should be appreciated that particular sub-division of Scout into various modules shown in Table 2 is one example implementation and various modifications may be made without departing from the scope of the present disclosure. Further, each of the example procedures for each module is merely an example and may be altered without departing from the scope of the present disclosure. For example, the sequence of steps in each procedure may be changed, one or more steps may be removed, and/or one or more steps may be added.

As discussed above, keystroke loggers track the individual keys that are depressed on the keyboard by a user interacting with a computing device. Tracking the individual keys that are depressed, however, may gather personal information of the user. Example personal information of a user includes information indicative of: a bank account of the user, a personal email account of the user, and/or a social media account of the user. In some embodiments, Scout may be designed to avoid capturing personal information of the user. For example, Scout may purposefully obscure the particular key that was depressed in a keyboard command 204. In this example, the event 208 may only include an indication that a keystroke was made and/or an indication of any modifier keys depressed with the keystroke (e.g., whether the Alt, Shift, and Caps keys were also depressed with the keystroke). Thereby, the usernames and/or passwords entered by a user interacting with the computing device are not stored in the events 208 and the user's privacy may be protected.

Figure 2B:
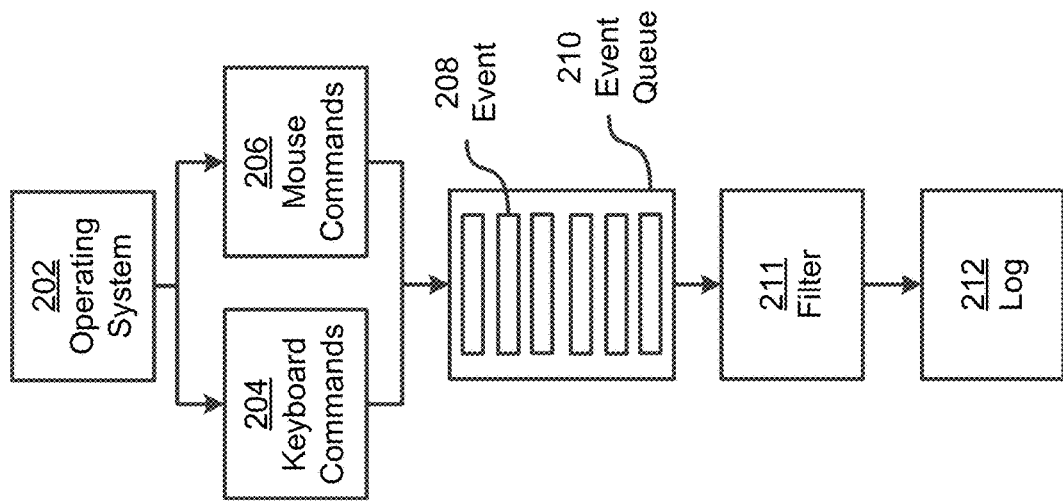
FIGS. 2A and 2B are each a diagram showing an example computer usage data collection process, according to some embodiments of the technology described herein.
Figure 2A:
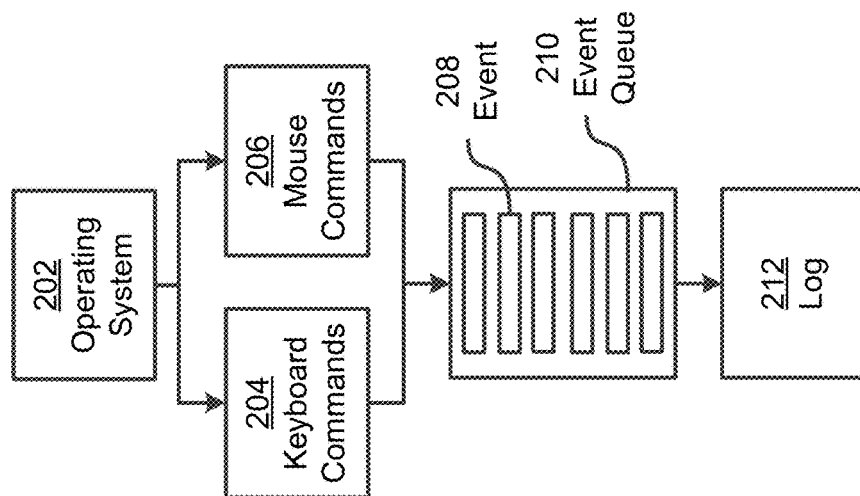

In some embodiments, Scout may be designed to delete any events 208 that contain personal information before writing the events 208 to the log 212. An example diagram of such a process is shown in FIG. 2B. As shown, the diagram in FIG. 2B adds a filter 211 between the event queue 210 and the log 212 relative to the diagram in FIG. 2A. The filter 211 may be implemented as, for example, an addition module in Scout. The filter 211 may be configured to analyze the events 208 that have been removed from the event queue 210 to determine whether the events contain any personal information prior to these events 208 being written to the log 212. For example, the filter 211 may identify events that involve particular URLs, such as URLS of banks, social media websites, and personal email accounts, as events that contain personal information. The filter 211 may stop the events 208 that contain personal information from being written to the log 212 and/or delete any copies of the event 208.

Example Task Identification Techniques

As discussed above, instances of Scout may be deployed on various computing devices to generate computer usage information. This computer usage information may be employed by Scout Service to gain insight into the particular tasks that the users are performing on these computing devices. For example, Scout Service may analyze the received computer usage information to identify repeated sequences of events in the computer usage data that are associated with specific tasks being performed by a user. Once a particular sequence of events is identified as a task, Scout Service may generate various metrics regarding the task such as an automation score that is indicative of the difficulty of automating the task.

Figure 3:
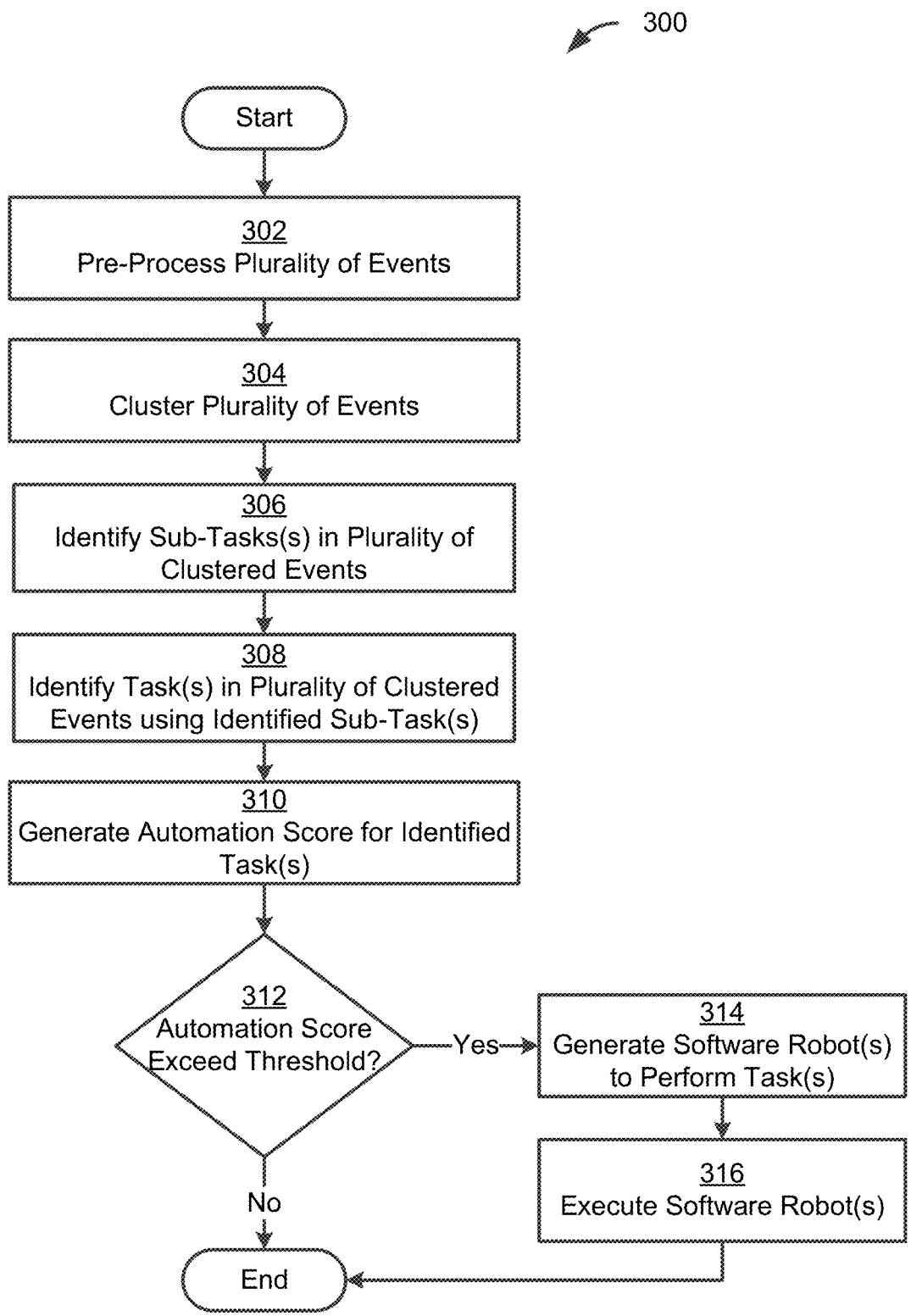
FIG. 3 is a flowchart showing an example task discovery process, according to some embodiments of the technology described herein.

FIG. 3 shows an example process 300 for identifying a task being performed by a user in computer usage data. Process 300 may be performed by, for example, Scout Service. As shown, the process 300 comprises an act 302 of pre-processing a plurality of events, an act 304 of clustering the plurality of events, an act 306 of identifying sub-task(s) in the plurality of clustered events, an act 308 of identifying task(s) in the plurality of clustered events using the identified sub-task(s), an act 310 of generating an automation score for identified task(s), an act 312 of determining whether the automation score exceeds a threshold, an act 314 of generating software robot(s) to perform task(s), and an act 316 of executing the software robot(s).

In act 302, Scout Service may pre-process a plurality of events. The plurality of events may be, for example, in one or more event log files received from one or more computing devices executing an instance of Scout. Scout Service may pre-process the plurality of events to, for example, remove noise from the computer usage data. Noise in the computer usage data may arise from any of a variety of circumstances. For example, a user may accidentally lay an object on the keyboard and inadvertently input a string of text into an application. In another example, an individual may bump a computer mouse while walking past a computing device. As another example, a user may highlight portions of text while reading the text. Scout Service may remove noise from the computer usage data by, for example, generating a blacklist that specifies one or more criteria for particular events that are not associated with any task (e.g., a series of keystroke actions caused by dropping something on the keyboard) and removing these events from the computer usage data and/or generating a whitelist that specifies one or more criteria for particular events that are associated with one or more tasks (e.g., events performed in a certain application, such as an IDE) . For example, Scout Service may perform any combination of the following: (1) remove events that are not proceeded and/or preceded by another event within a certain period of time, such as 120 seconds; (2) remove events that are not associated with a set of one or more applications (e.g., an IDE application, an enterprise resource planning (ERP) application, and an internet browser application); (3) remove events that are associated with a set of one or more web domains (e.g., web domains associated with social media websites); and (4) replace one or more numbers in at least some of the plurality of events with a standard set of one or more characters (e.g., "#" character).

In act 304, Scout Service may cluster the plurality of events to generate a plurality of clustered events. The clustering may, for example, group semantically similar events together. For example, two events associated with accessing the same HTML element may appear slightly different in each instance because the HTML element may comprise parameters that change (such as a product identifier). In this example, the two events associated with accessing the same HTML element may be assigned to the same cluster (e.g., clustered together). The plurality of events may be clustered by, for example, identifying a plurality of clusters in the plurality of events and assigning at least some of the plurality of events to a cluster in the plurality of clusters. Any of a variety of clustering techniques may be employed to cluster the events. For example, the plurality of events may be clustered based on a distance between the plurality of events such that events that are within a threshold distance from each other are assigned to the same cluster while events that are outside the threshold distance from each other are assigned to different clusters.

In some embodiments, Scout Service may employ hierarchical clustering techniques to cluster the plurality of events. In these embodiments, the events of the plurality of events may comprise multiple layers of information and clustered may be identified at each layer within the plurality of layers. For example, an event may comprise: (1) an action; (2) an indication of which GUI screen the action was performed in (e.g., which GUI screen of a plurality of GUI screens associated with an application); and (3) an indication of which application the application was performed in. In this example, Scout Service may cluster the plurality of events by GUI screen (e.g., events that are associated with the same GUI screen are grouped together) and also cluster the plurality of events by application (e.g., events that are associated with the application are grouped together). Thereby, each event may be assigned to a plurality of clusters.

Figure 5:
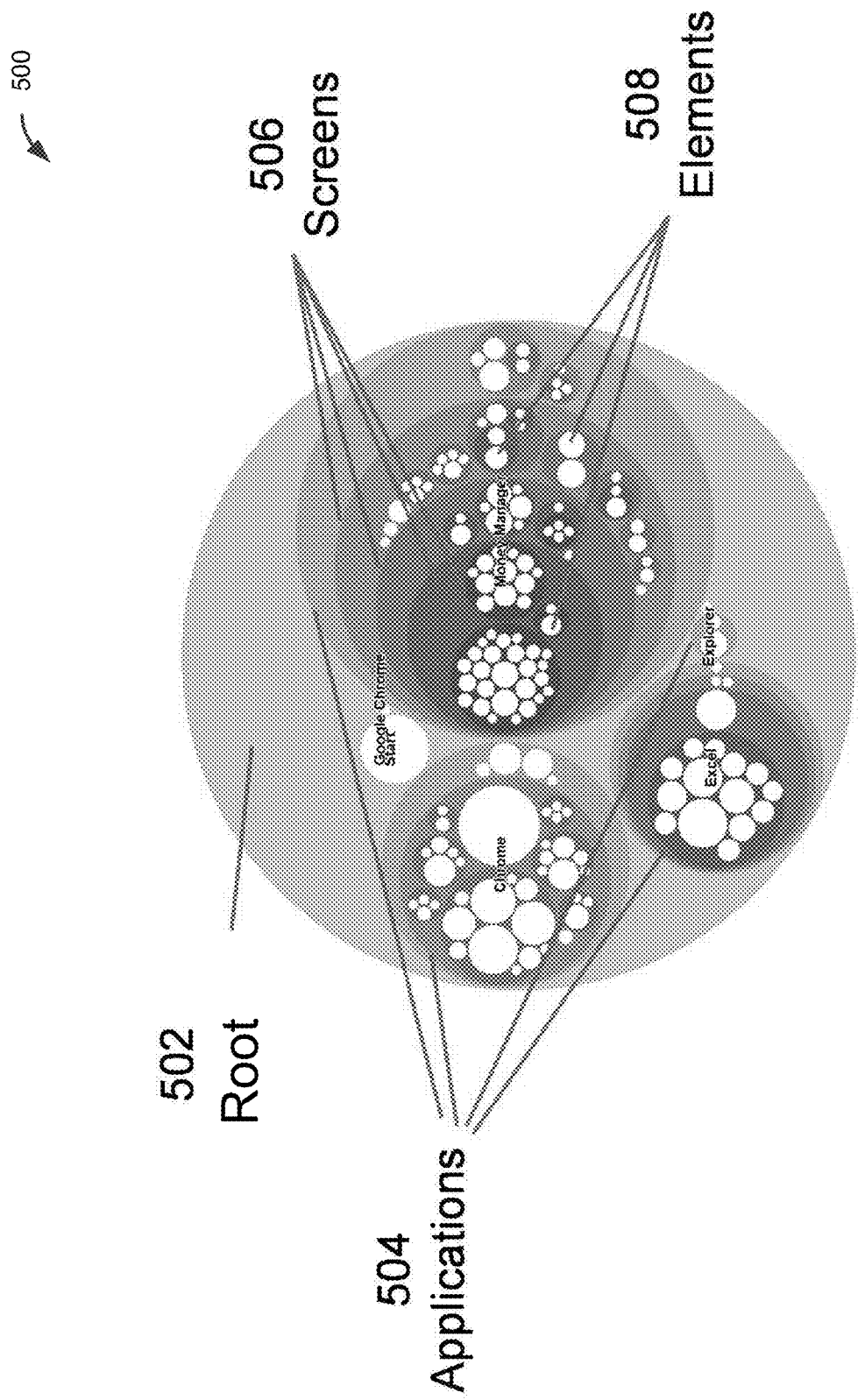
FIG. 5 is a diagram showing an example plurality of events that have been hierarchically clustered, according to some embodiments of the technology described herein.

An example plurality of events that are hierarchically clustered is shown in FIG. 5 by hierarchically clustered events 500. As shown, the hierarchically clustered events 500 are clustered across five layers ordered from broadest to narrowest: (1) root 502; (2) application 504; (3) GUI screen 506; and (4) element 508. Each cluster in the hierarchically clustered events 500 is represented by a circle. The size of each circle may be indicative of, for example, the number of events that are assigned to the cluster associated with the circle. As shown in the hierarchically clustered events 500, the user primarily uses the "Start" button in a WINDOWS operating system to access four different applications ordered from most frequently used to least frequently used: (1) Money Manager; (2) Chrome; (3) Excel; and (4) Explorer.

Returning to FIG. 3, Scout Service may identify one or more sub-tasks in the plurality of clustered events in act 306. Sub-tasks may be, for example, a sequence of one or more clustered events that at least partially repeat in the plurality of clustered events a threshold number of times. The sequence of one or more clustered events may repeat fully (e.g., every event in the sequence repeats exactly) or repeat partially (e.g., a threshold number of events in the sequence of events repeats). Scout Service may identify the sequence of one or more clustered events using any of a variety of techniques.

In act 308, Scout Service may identify task(s) in the plurality of clustered events using the identified sub-tasks. For example, Scout Service may combine a sub-task with one or more other clustered events (and/or other sub-tasks) temporally adjacent the sub-task in at least one instance in the plurality of clustered events to identify a higher-level task. Scout Service may identify a task using any of a variety of techniques. In some embodiments, Scout Service may receive an indication of which task one or more sub-tasks belongs to. For example, a human user may indicate that a particular sub-task is associated with a password reset task. The received indication of which task a sub-task belongs to may be, for example, in the form of one or more rules that define a set of criteria which must be present for a sub-task (and/or a clustered event) to be assigned to the task associated with the rule. The rules may be implemented as, for example, regular expressions. For example, a rule may be created for the task "web browsing" that includes a regular expression indicating that the active application field in an event must include a web browsing application such as GOOGLE CHROME for the event to be assigned to the web browsing task. Additional example rules that may be created are shown below in Table 3 below.

TABLE 3

Example Rules

| Application Field | Title Field | Task |
| --- | --- | --- |
| Web Browser | Gmail | Personal Email |
| Pycharm | — | Coding |
| Web Browser | YouTube | Entertainment |
| Web Browser | Gitlab | Writing Documentation |
| Web Browser | stackoverflow | Research |

Once a sub-task is assigned to a particular task, Scout Service may determine whether one or more clustered events that are temporally adjacent the sub-task in at least one instance in the clustered events are also associated with the task. In some embodiments, Scout Service may identify a unique feature (e.g., a value in a field of a GUI) in an instance of a sub-task that is both persistent through the events in the sub-task and unique in each instance of the sub-task (e.g., a price in a purchase order generation task). The unique feature may be identified by calculating entropy values for one or more features for events in the sub-task. Features that are the same between instances of the same sub-task have a low entropy and may be removed. Features that differ between instances of the same sub-task have a high entropy and may be identified as unique features. Once the unique features have been identified, Scout Service may analyze clustered events that temporally adjacent the sub-task in at least one instance to determine whether those clustered events contain the same unique features as the sub-task. If the clustered events temporally adjacent the sub-task contain the unique features, the clustered events are likely part of the same task (and may be added to a sequence of one or more clustered events that define the task). Otherwise, the clustered events are not likely part of the same task and may be ignored.

In some embodiments, Scout Service may determine whether one or more clustered events that are temporally adjacent the sub-task in at least one instance in the clustered events are also associated with the task using a statistical model. In these embodiments, a first sub-task may be identified that defines the start of a task and a second sub-task may be identified that defines the end of the same task. For example, the user may indicate that they always start a task by opening a particular application and end the task by closing the particular application. The clustered events may, in turn, be analyzed to identify instances in the plurality of clustered events where the first sub-task and second sub-tasks occur with one or more intervening clustered events. The identified instances where the first and second sub-tasks occur with one or more intervening clustered events may be provided as an input to a statistical model. Scout Service may use the statistical model to obtain an output indicative of which intervening events in the identified instances where the first and second sub-tasks occur are part of the task and which intervening events are unrelated to the task. For example, Scout Service may use the statistical model to obtain an output indicative of a sequence of clustered events that define the task (e.g., a Markov chain of clustered events) that includes the clustered events in each of the first and second sub-tasks.

In some embodiments, the statistical model may be a neural network and, for example, may be a recurrent neural network. In some embodiments, the recurrent neural network may be a long short-term memory (LSTM) neural network. It should be appreciated, however, that the recurrent neural network is not limited to being an LSTM neural network and may have any other suitable architecture. For example, in some embodiments, the recurrent neural network may be a fully recurrent neural network, a recursive neural network, a Hopfield neural network, an associative memory neural network, an Elman neural network, a Jordan neural network, an echo state neural network, a second order recurrent neural network, and/or any other suitable type of recurrent neural network. In other embodiments, neural networks that are not recurrent neural networks may be used. For example, deep neural networks, convolutional neural networks, and/or feedforward neural networks, may be used.

In act 310, Scout Service may generate an automation score indicative of a difficulty of automating the identified tasks. The automation score may be employed to quickly locate tasks that are likely good candidates for automation by, for example, a software robot. Scout Service may generate the automation score by generating task information (e.g., information regarding the task) and analyzing the generated task information. The task information may comprise a set of one or more parameters and their corresponding values that impact the automatability of a given task. Example parameters include: a number of applications that are employed to perform the task (more applications may increase the complexity of automating the task), a number of keystrokes performed in the task (more keystrokes may increase the complexity of automating the task), and a ratio between keystrokes and clicks performed in the task (more keystrokes per click may increase the complexity of automating the task). Scout Service may, in turn, generate the automation score by linearly combining the values from one or more parameters in the task information.

In some embodiments, the task information (and, thereby, the set of one or more parameters and their corresponding values in the task information) may be divided into a plurality of information categories including, for example, human activity information (e.g., information indicative of the human activity performed in the task), application information (e.g., information regarding the applications employed in the task), input data information (e.g., information regarding the input to a computer device in the task), and task flow information (e.g., information regarding the sequence of events in the task). Example parameters for each of the human activity information, the application information, the input data information, and the task flow information is shown below in Table 4:

TABLE 4

Task Information Categories

| Human Activity Information | Application Information | Input Data Information | Task Flow Information |
|---|---|---|---|
| Percentage of time Typing | Number of Application Used | Amount of Text Extractable Documents Employed during Task | Length of Sequences in Sub-Task(s) and/or Task |
| Percentage of time Clicking | Number of User Interface Screens Used | Amount of Natural Language Input into Applications during Task | Number of Times Sequences Repeat in Sub-Task(s) and/or Task |
| Time between actions | Number of User Interface Elements Used | Source of Information input into Applications during Task | |
| Frequency of Copy and Paste behaviors | | | |

It should be appreciated that other values may be determined for particular tasks separate from an automation score. For example, Scout Service may determine an estimated cost savings of automating the process by determining the amount of time spent performing the task and the value of an employee's time to perform the task. In this example, the determined estimated cost savings may be compared with an estimated cost of automating the process to identify tasks that are likely to yield the most economic value by automating with a software robot.

In act 312, Scout Service may determine whether the automation score exceeds a threshold. For example, a task with an automation score that exceeds the threshold may be a good candidate for automation. Accordingly, Scout Service may proceed to automate the task if the automation score exceeds the threshold by performing act 314 of generating software robot(s) to perform the task and act 316 of executing the generated software robot(s). Otherwise, the task is likely not a good candidate for automation and process 300 ends.

In act 314, Scout Service may generate a software robot that is configured to perform the task. The software robot may be configured to control the same set of one or more computer programs employed in the task and/or any sub-tasks. For example, the task may comprise a first sub-task performed in a first computer program and a second sub-task performed in a second, different computer program. In this example, Scout Service may generate a software robot configured to control the first computer program to perform the first sub-task and control the second computer program to perform the second sub-task.

Scout Service may generate the software robot in any of a variety of ways. In some embodiments, Scout Service generates the software robot using, for example, the sequence of one or more events defining the task that was identified in act 308. For example, Scout Service may comprise one or more predetermined software routines for replicating one or more events and Scout Service may combine these software routines in accordance with the defined sequence of events associated with the task to form a software robot that is configured to perform the task.

In act 316, Scout Service may execute one or more instances of the software robot(s) generated in act 314. For example, Scout Service may identify one or more computing devices and start an instance of the software robot(s) on the identified one or more computing devices.

Figure 4:
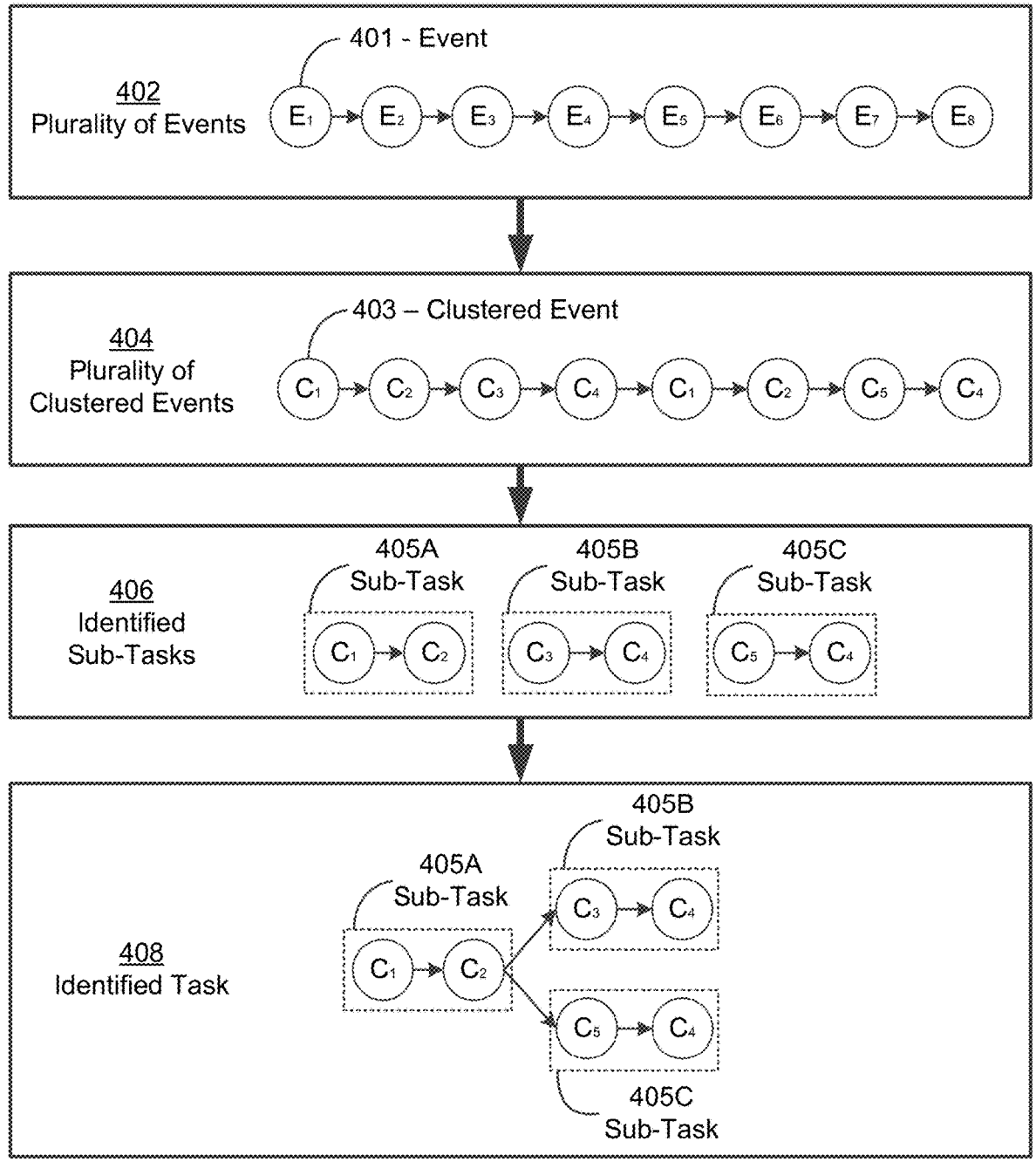
FIG. 4 is a diagram showing an example plurality of events associated with a task, according to some embodiments of the technology described herein.

FIG. 4 shows an example plurality of events 402 associated with an example task of adding two numbers using a calculator application. In particular, the task comprises adding a "1" with another number that is either a "2" or a "3." This task may be defined by three sub-tasks comprising a first sub-task of entering the "1" digit into the calculator and pressing the "+" key that branches into either a second sub-task of entering the "2" digit into the calculator and pressing the "=" key or a third sub-task of entering the "3" digit into the calculator and pressing the "=" key.

As shown in FIG. 4, the plurality of events 402 comprises a set of eight events 401 that are organized based on their order of occurrence. Table 5 below shows a description of each event 401 in the plurality of events 402.

TABLE 5

Example Events in a Task

| Event Number | Event Description |
| --- | --- |
| 1 | Mouse Click on "1" Button |
| 2 | Mouse Click on "+" Button |
| 3 | Mouse Click on "2" Button |
| 4 | Mouse Click on "=" Button |
| 5 | Mouse Click on "1" Button |
| 6 | Mouse Click on "+" Button |
| 7 | Mouse Click on "3" Button |
| 8 | Mouse Click on "=" Button |

The plurality of events 402 may be clustered to generate the plurality of clustered events 404 by, for example, identifying a plurality of clusters and assigning each of the events 402 to at least one of the identified clusters. As shown, each of the eight events 401 is assigned to one of five different clusters to generate clustered events 403. Table 6 below shows the mapping of event numbers to clusters.

TABLE 6

Example Clustering of Events

| Cluster Number | Cluster Definition | Corresponding Event Numbers |
| --- | --- | --- |
| 1 | Mouse Click on "1" Button | 1, 5 |
| 2 | Mouse Click on "+" Button | 2, 6 |
| 3 | Mouse Click on "2" Button | 3 |
| 4 | Mouse Click on "=" Button | 4, 8 |
| 5 | Mouse Click on "3" Button | 7 |

Once the plurality of events 402 have been clustered to generate the plurality of clustered events 404, one or more one or more sub-tasks may be identified in the plurality of clustered events 404. As shown, the plurality of clustered events 404 comprises three different sub-tasks comprising a first sub-task 405A of entering the "1" digit into the calculator and pressing the "+" key that branches into either a second sub-task 405B of entering the "2" digit into the calculator and pressing the "=" key or a third sub-task 405C of entering the "3" digit into the calculator and pressing the "=" key. The sub-tasks 405A-405C may be combined to form the identified task 408.

Example Computer System

Figure 6:
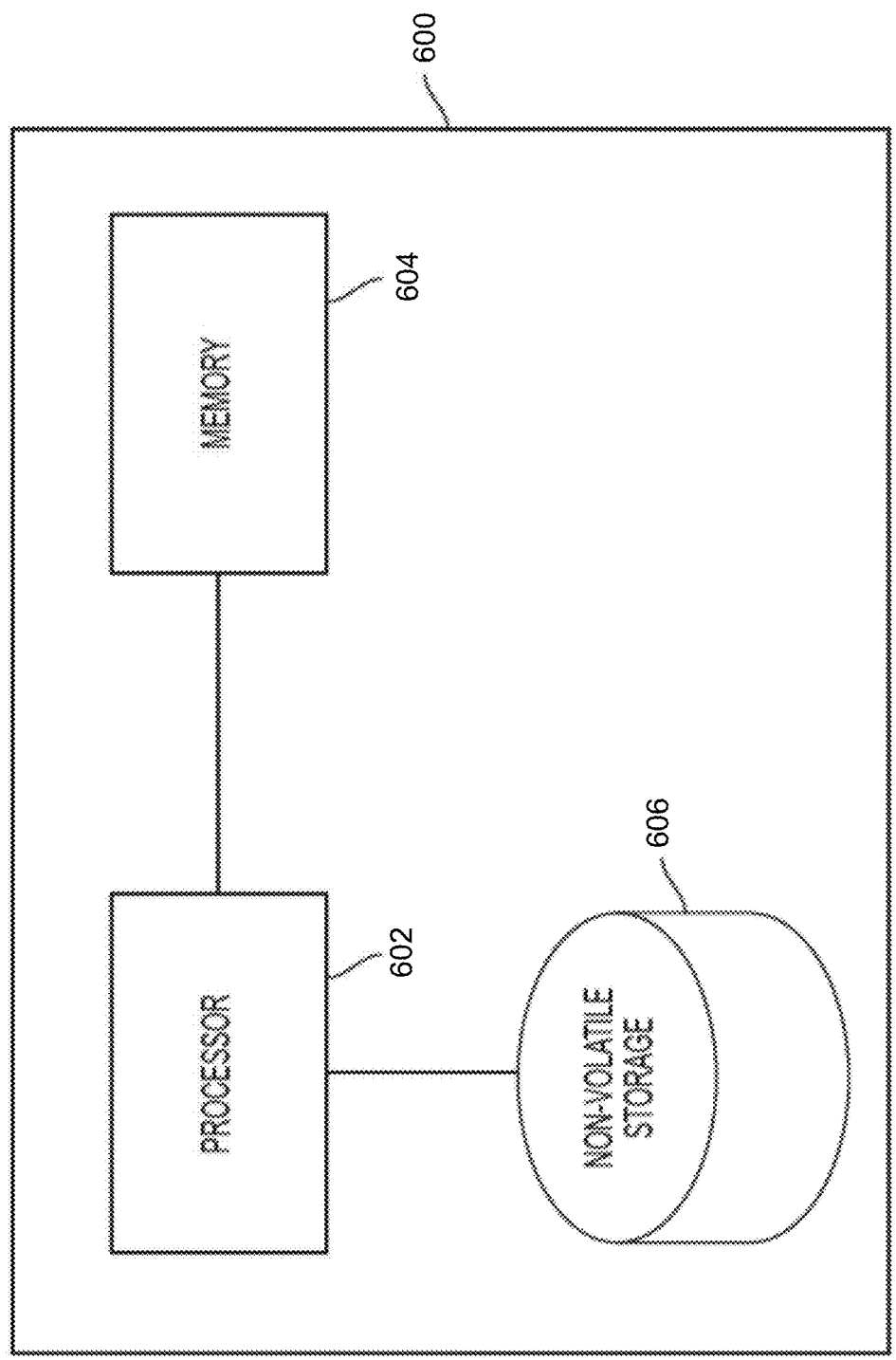
FIG. 6 is a block diagram of an example computer system, according to some embodiments of the technology described herein.

An illustrative implementation of a computer system 600 that may be used in connection with any of the embodiments of the disclosure provided herein is shown in FIG. 6. The computer system 600 may include one or more computer hardware processors 602 and one or more articles of manufacture that comprise non-transitory computer-readable storage media (e.g., memory 604 and one or more non-volatile storage devices 606). The processor 602(s) may control writing data to and reading data from the memory 604 and the non-volatile storage device(s) 606 in any suitable manner. To perform any of the functionality described herein, the processor(s) 602 may execute one or more processor-executable instructions stored in one or more non-transitory computer-readable storage media (e.g., the memory 604), which may serve as non-transitory computer-readable storage media storing processor-executable instructions for execution by the processor(s) 602.

The terms "program" or "software" are used herein in a generic sense to refer to any type of computer code or set of processor-executable instructions that can be employed to program a computer or other processor (physical or virtual) to implement various aspects of embodiments as discussed above. Additionally, according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Various inventive concepts may be embodied as one or more processes, of which examples have been provided. The acts performed as part of each process may be ordered in any suitable way. Thus, embodiments may be constructed in which acts are performed in an order different than illustrated, which may include performing some acts simultaneously, even though shown as sequential acts in illustrative embodiments.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, for example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements);etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term). The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A system, comprising:
   at least one hardware processor; and
   at least one non-transitory computer-readable storage medium storing processor-executable instructions that, when executed by the at least one hardware processor, cause the at least one hardware processor to perform:
   receiving a plurality of events each of at least some of the plurality of events being indicative of an action performed by a user on a computing device and contextual information associated with the action performed by the user;
   identifying a task being performed by the user at least in part by clustering events in the plurality of events; and
   generating a score for the task indicative of a difficulty of automating the task, wherein the score is generated using at least one value selected from the group consisting of: information identifying applications used to perform the task, a number of applications used to perform the task, a number of user interface elements used in the task, an amount of natural language input provided to the applications during the task, a number of keystrokes performed in the task, a number of clicks performed in the task, a ratio between keystrokes and clicks performed in the task, a percentage of time spent performing typing actions in the task, a percentage of time spent performing clicking actions in the task, and a frequency of copy and paste actions performed in the task.

2. The system of claim 1, wherein identifying the task being performed by the user at least in part by clustering events in the plurality of events comprises:
   analyzing a plurality of clustered events obtained by applying a clustering technique to events in the plurality of events;
   identifying a plurality of sub-tasks in the plurality of clustered events that each comprise a sequence of one or more clustered events at least partially repeated in the plurality of clustered events; and
   identifying the task being performed by the user in the plurality of clustered events that comprises at least one sub-task from the plurality of sub-tasks.

3. The system of claim 1, wherein the processor-executable instructions further cause the at least one hardware processor to perform:
   determining whether the score exceeds a threshold;
   generating a first computer program that is configured to perform the task responsive to the score exceeding the threshold; and
   executing the first computer program configured to perform the task responsive to generating the first computer program.

4. The system of claim 3, wherein the first computer program is configured to perform the task at least in part by controlling one or more other computer programs through at least one graphical user interface (GUI) of the one or more other computer programs.

5. The system of claim 1, wherein the generating of the score is further based on using information identifying the user interface elements used to perform the task, an amount of text extractable documents employed in the task, and/or time between actions performed in the task.

6. The system of claim 1, wherein the score is generated using a linear combination of two or more of: the information identifying applications used to perform the task, the number of applications used to perform the task, the number of user interface elements used in the task, the amount of natural language input provided to the applications during the task, the number of keystrokes performed in the task, the number of clicks performed in the task, the ratio between keystrokes and clicks performed in the task, the percentage of time spent performing typing actions in the task, the percentage of time spent performing clicking actions in the task, and the frequency of copy and paste actions performed in the task.

7. The system of claim 1, wherein the action includes a keystroke or a click.

8. The system of claim 1, wherein the contextual information includes information regarding a state of the user interface when the user performed the action.

9. The system of claim 8, wherein the information regarding the state of the user interface includes at least one of: a name of an active application, a title in a title bar of the active application, a value in at least one field of the active application, a size of a window of the active application, and a location of the window of the active application.

10. A method, performed by a computing device, for discovering automatable tasks, the method comprising:

receiving a plurality of events each indicative of an action performed by a user on a computing device and contextual information associated with the action performed by the user;

identifying a task being performed by the user at least in part by clustering events in the plurality of events; and generating a score associated with the task indicative of a difficulty of automating the task, wherein the score is generated using at least one value selected from the group consisting of: information identifying applications used to perform the task, a number of applications used to perform the task, a number of user interface elements used in the task, an amount of natural language input provided to the applications during the task, a number of keystrokes performed in the task, a number of clicks performed in the task, a ratio between keystrokes and clicks performed in the task, a percentage of time spent performing typing actions in the task, a percentage of time spent performing clicking actions in the task, and a frequency of copy and paste actions performed in the task.

11. The method of claim 10, wherein identifying the task being performed by the user at least in part by clustering events in the plurality of events comprises:

analyzing a plurality of clustered events obtained by applying a clustering technique to events in the plurality of events;

identifying a plurality of sub-tasks in the plurality of clustered events that each comprise a sequence of one or more clustered events at least partially repeated in the plurality of clustered events; and identifying the task being performed by the user in the plurality of clustered events that comprises at least one sub-task from the plurality of sub-tasks.

12. The method of claim 10, further comprising:
determining whether the score exceeds a threshold;
generating a first computer program that is configured to perform the task responsive to the score exceeding the threshold; and
executing the first computer program configured to perform the task responsive to generating the first computer program.

13. The method of claim 12, wherein the first computer program is configured to perform the task at least in part by controlling one or more other computer programs through at least one graphical user interface (GUI) of the one or more other computer programs.

14. The method of claim 10, wherein the generating of the score is further based on using information identifying the user interface elements used to perform the task, an amount of text extractable documents employed in the task, and/or time between actions performed in the task.

15. The method of claim 10, wherein the score is generated using a linear combination of two or more of: the information identifying applications used to perform the task, the number of applications used to perform the task, the number of user interface elements used in the task, the amount of natural language input provided to the applications during the task, the number of keystrokes performed in the task, the number of clicks performed in the task, the ratio between keystrokes and clicks performed in the task, the percentage of time spent performing typing actions in the task, the percentage of time spent performing clicking actions in the task, and the frequency of copy and paste actions performed in the task.

16. At least one non-transitory computer-readable storage medium storing processor-executable instructions that, when executed by at least one processor, cause the at least one processor to perform:

receiving a plurality of events each indicative of an action performed by a user on a computing device and contextual information associated with the action performed by the user;

identifying a task being performed by the user at least in part by clustering events in the plurality of events; and generating a score associated with the task indicative of a difficulty of automating the task, wherein the score is generated using at least one value selected from the group consisting of: information identifying applications used to perform the task, a number of applications used to perform the task, a number of user interface elements used in the task, an amount of natural language input provided to the applications during the task, a number of keystrokes performed in the task, a number of clicks performed in the task, a ratio between keystrokes and clicks performed in the task, a percentage of time spent performing typing actions in the task, a percentage of time spent performing clicking actions in the task, and a frequency of copy and paste actions performed in the task.

17. The at least one non-transitory computer-readable storage medium of claim 16, wherein identifying the task being performed by the user at least in part by clustering events in the plurality of events comprises:

analyzing a plurality of clustered events obtained by applying a clustering technique to events in the plurality of events;

identifying a plurality of sub-tasks in the plurality of clustered events that each comprise a sequence of one or more clustered events at least partially repeated in the plurality of clustered events; and identifying the task being performed by the user in the plurality of clustered events that comprises at least one sub-task from the plurality of sub-tasks.

18. The at least one non-transitory computer-readable storage medium of claim 16, wherein the processor-executable instructions further cause the at least one processor to perform:

determining whether the score exceeds a threshold;
generating a first computer program that is configured to perform the task responsive to the score exceeding the threshold; and
executing the first computer program configured to perform the task responsive to generating the first computer program.

19. The at least one non-transitory computer-readable storage medium of claim 16, wherein the generating of the score is further based on using information identifying the user interface elements used to perform the task, an amount of text extractable documents employed in the task, and/or time between actions performed in the task.

20. The at least one non-transitory computer-readable storage medium of claim 16, wherein the score is generated using a linear combination of two or more of: the information identifying applications used to perform the task, the number of applications used to perform the task, the number of user interface elements used in the task, the amount of natural language input provided to the applications during the task, the number of keystrokes performed in the task, the number of clicks performed in the task, the ratio between keystrokes and clicks performed in the task, the percentage of time spent performing typing actions in the task, the percentage of time spent performing clicking actions in the task, and the frequency of copy and paste actions performed in the task.

* * * * *